June 21, 1955 R. M. M. OBERMAN 2,711,444

JUNCTION DIAGRAM FOR AUTOMATIC SWITCHING SYSTEM

Filed July 25, 1952 13 Sheets-Sheet 1

INVENTOR:
ROELOF MAARTEN MARIE OBERMAN

BY Hugh A. Kirk

ATTY.

INVENTOR:
ROELOF MAARTEN MARIE OBERMAN
BY Hugh A. Kirk
ATTY.

June 21, 1955 R. M. M. OBERMAN 2,711,444

JUNCTION DIAGRAM FOR AUTOMATIC SWITCHING SYSTEM

Filed July 25, 1952 13 Sheets-Sheet 3

INVENTOR:
ROELOF MAARTEN MARIE OBERMAN.

BY Hugh A. Kirk

ATTY.

INVENTOR:
ROELOF MAARTEN MARIE OBERMAN
BY Hugh A Kirk
ATTY.

June 21, 1955 R. M. M. OBERMAN 2,711,444

JUNCTION DIAGRAM FOR AUTOMATIC SWITCHING SYSTEM

Filed July 25, 1952 13 Sheets-Sheet 5

INVENTOR:
ROELOF MAARTEN MARIE OBERMAN

BY Hugh A. Kirk

ATT'Y.

June 21, 1955 R. M. M. OBERMAN 2,711,444

JUNCTION DIAGRAM FOR AUTOMATIC SWITCHING SYSTEM

Filed July 25, 1952 13 Sheets-Sheet 6

INVENTOR:
ROELOF MAARTEN MARIE OBERMAN.

BY Hugh A Kirk

ATTY.

June 21, 1955 R. M. M. OBERMAN 2,711,444

JUNCTION DIAGRAM FOR AUTOMATIC SWITCHING SYSTEM

Filed July 25, 1952 13 Sheets-Sheet 7

INVENTOR:
ROELOF MAARTEN MARIE OBERMAN

BY Hugh A Kirk

ATTY.

June 21, 1955 R. M. M. OBERMAN 2,711,444
JUNCTION DIAGRAM FOR AUTOMATIC SWITCHING SYSTEM
Filed July 25, 1952 13 Sheets-Sheet 8
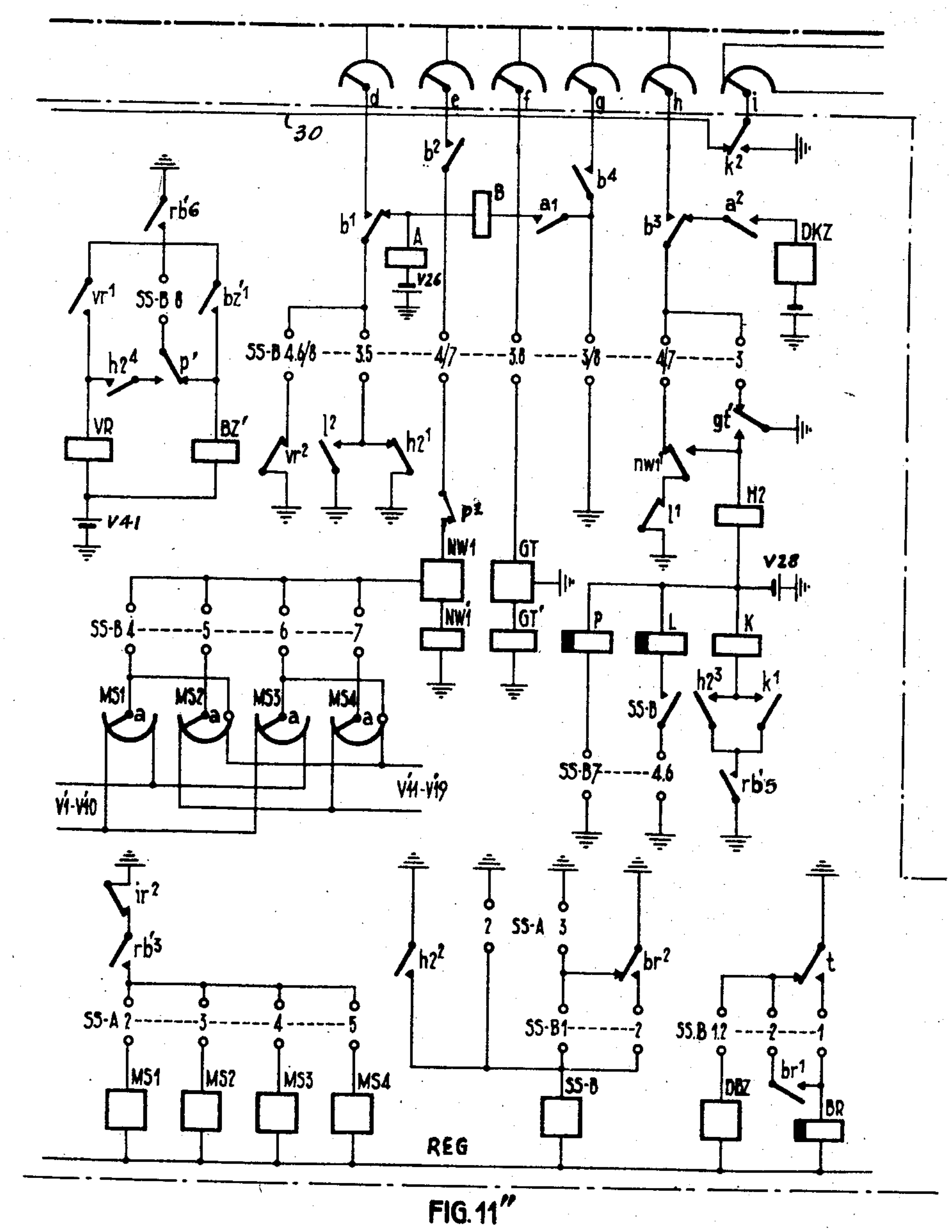
FIG. 11"
INVENTOR:
ROELOF MAARTEN MARIE OBERMAN
BY Hugh A. Kirk
ATTY.

INVENTOR:
ROELOF MAARTEN MARIE OBERMAN
BY Hugh A. Kirk
ATTY.

INVENTOR:
ROELOF MAARTEN MARIE OBERMAN

BY Hugh A. Kirk

ATTY.

June 21, 1955 R. M. M. OBERMAN 2,711,444

JUNCTION DIAGRAM FOR AUTOMATIC SWITCHING SYSTEM

Filed July 25, 1952 13 Sheets-Sheet 11

INVENTOR:
ROELOF MAARTEN MARIE OBERMAN
BY Hugh A. Kirk
ATTY.

June 21, 1955 R. M. M. OBERMAN 2,711,444

JUNCTION DIAGRAM FOR AUTOMATIC SWITCHING SYSTEM

Filed July 25, 1952 13 Sheets-Sheet 12

INVENTOR:
ROELOF MAARTEN MARIE OBERMAN
BY
[signature]
ATTY.

INVENTOR:
ROELOF MAARTEN MARIE OBERMAN
BY Hugh A. Kirk
ATTY.

United States Patent Office 2,711,444

Patented June 21, 1955

2,711,444

JUNCTION DIAGRAM FOR AUTOMATIC SWITCHING SYSTEM

Roelof Maarten Marie Oberman, The Hague, Netherlands, assignor to De Staat der Nederlanden Ten Deze Vertegenwoordigd Door de Directeur-Generaal der Posterijen, Telegrafie en Telefonie, The Hague, Netherlands Application July 25, 1952, Serial No. 300,806

20 Claims. (Cl. 179—18)

This invention relates to an automatic electrical switching system for connecting a plurality of subscribers, each having a call number, such as in an automatic telephone or telegraph system. More particularly, it deals with a system having a plurality of line finding and selecting stages of selector switches connected by link and cord circuits under the control of a register, director sender, and/or the like, in which a connection through at least part of said switches is preselected and reserved according to a free path determined by the circuits of this invention responsive to the busy condition of different groups of said switches, their connecting circuits and their controlling or register circuits.

This invention is an improvement over the Oberman prior co-pending application Serial No. 230,277, filed June 7, 1951, which is directed to a circuit for preselecting a free final selector of a called subscriber in an automatic telephone switching system in accordance with the first digits of a subscriber's number being called, whereby an economy in the number of selectors for a given switching system may be obtained and the exchange may be easily enlarged for increased amounts of traffic.

It is an object of the present invention to produce an efficient, economic and effective automatic switching system in which the path of connections through the system is preselected and reserved according to both the condition of available connecting circuits and the digits of a called number or direction in which the connection is to be made.

Another object is to improve and further preselect more of the selector switches in an exchange than that possible by the circuit disclosed in said prior Oberman application Serial No. 230,277.

Another object is to produce such an automatic switching system in which the number of selecting stages, as well as the number of selecting switches and connecting apparatus for an exchange of a given number of subscribers or lines, may be materially reduced, whereby the talking or direct connecting wires between two subscribers may pass through a fewer number of electrical contacts.

Another object is to produce such an automatic switching system in which each selector switch of at least one hundred points or contacts, including the second line finders and first selector stages, may be positioned according to two digits of the number of the subscribers in the system.

Another object is to produce such a system in which the traffic through the system is automatically distributed through the least busy groups of the connecting circuits and stages employed in the system, so as to materially reduce internal blocking of the system and correspondingly reduce the number of connecting circuits required for a system of a given number of subscriber lines.

Another object is to produce such an automatic switching system in which a calling subscriber automatically and simultaneously selects and reserves a group of circuits containing free and available cords, links and registers which may be connected together, to any final selector, and to the calling subscriber, before any request for a called subscriber is made by the calling subscriber.

Another object is to produce an automatic switching system in which the second line finder and first selector may be combined in a cord circuit, which circuit is available to any one of the groups of multipled first line finders and multipled final selectors connected to the subscribers of the system, which first line finders and final selectors also may be combined.

Another object is to produce a system in which at least one stage of line finders and one stage of selectors are not required to hunt for a free and available line, but are controlled to be positioned simultaneously on a preselected free and available connection.

Generally speaking, the system of this invention comprises connecting means for connecting a controlling circuit or register between the first line finders and the final selectors in an exchange of such an automatic switching system, thus bridging the second line finders and initial selectors of the system, which are selected and predetermined according to their availability for producing the desired connection through the circuit. The register, thus, contains means for connecting it to: the multipled group of first line finders of the calling subscriber, a corresponding group of cord or interconnecting circuits, and the multipled group of final selectors of the desired called subscriber. The second line finder and first selector, accordingly, may be connected together with and made a part of the corresponding cord circuit which connects the desired first line finder with the desired final selector, so that the same number of cord circuits as second line finders and as first selectors may be employed in the exchange.

In order to determine a free and available combination of connecting circuits and a corresponding controlling register, auxiliary distributing, reserving and starting circuits are provided, which may be instigated by a call detector. The distributing circuit may comprise chains of contacts controlled by the reserving circuits corresponding to the associated groups of cord circuits and registers that are free and available, and a group of relays corresponding to each link corresponding to each first line finder multipled in a group corresponding to the calling subscriber. Thereby a calling subscriber is immediately and automatically connected to a free register which is associated with a group of cord circuits and a group of link circuits which may be connected to said register and to said calling and any called subscriber, respectively. As soon as this register is seized it reserves in its corresponding reserving circuit an associated cord circuit and finds back the calling subscriber through its associated link circuit.

Now, the register is connected for receiving the dialing pulses or call number of the called subscriber from the calling subscriber. This register, accordingly, immediately detects the first digits of the called subscriber's number, which correspond to the setting of the first selectors in the system, and sets a connecting means, herein a busy test selector, to preselect the corresponding multipled group of final selectors connected to the called subscriber. Next a cord finder associated with the seized register finds a free cord circuit which may be connected to a free final selector in said preselected group of desired final selectors.

After the calling first line finder and cord circuit have been seized, the second line finder and first selector may be positioned simultaneously under the control of the register, with the positioning of the final selector immediately following the positioning of the first selector, so that the connection may be directly set-up through the positioned selectors through the exchange. Thus, for example, in a four digit exchange providing selector switches of a hundred contacts or points each, the whole set-up for a 10,000 line system may be controlled by only one stage of first line finders (units and tens digits of calling subscribers), one stage of second line finders, (hundreds and thousands digits of calling subscribers), one stage of first selectors (thousands and hundreds digits of called subscribers), and one stage of final selectors (tens and units digits of called subscribers).

As soon as the cord circuit is connected to the called and calling subscribers' lines, a busy or free indication is made of the called subscriber's line to give respectively either a busy signal to the calling subscriber or a ringing signal to the called subscriber. When the called subscriber answers, the cord circuit operates its corresponding "occupied" contact in the reserving circuit, and the register with its link finder, cord finder and busy test selector may be released for use in setting-up other connections through its associated groups. After a call has been completed it can be arranged in the cord circuit to disconnect the cord circuit either when both calling and called subscribers cut-off or hang-up or when just, the called subscriber hangs-up, which also may control a busy signal and/or an alarm. Further circuits may also be provided in the cord circuit for metering impulses and give an alarm in the event the metering circuit is out of order.

The reserving circuits connected to the distributors may comprise groups of chains of contacts corresponding to the groups of registers and corresponding cord circuits, which groups may be made responsive to an equal predetermined number of busy and reserved cord circuits and busy registers in each group, so that the connections through the exchange will be evenly distributed over all of the groups of the cord circuits and registers. This predetermined number may, after all of the associated groups have reached that number of busy and reserved cord circuits and registers, be increased in one or more steps for further even distribution of the connections throughout the exchange, and then when all of the associated cords or registers of a group are busy or reserved, the group may be blocked from the system and automatically by-passed until it has become less occupied.

The above mentioned and other features and objects of this invention and the manner of attaining them are given more specific disclosure in the following description of embodiments of this invention taken in conjunction with the accompanying drawings, wherein.

Figure 3:
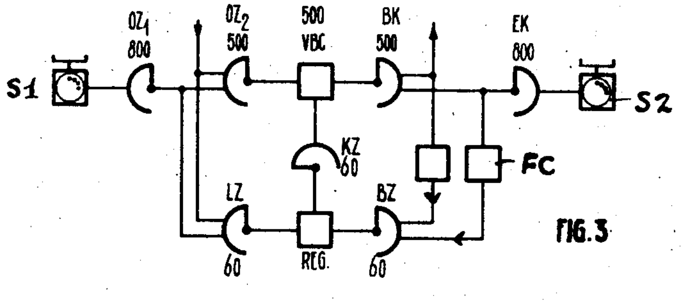
Fig. 3 is a schematic block junction diagram of a four digit exchange in which the diagram of Fig. 2 has been modified according to the automatic switching system of the present invention.
Figure 4:
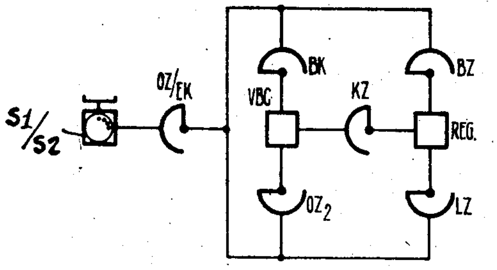
Figure 3:
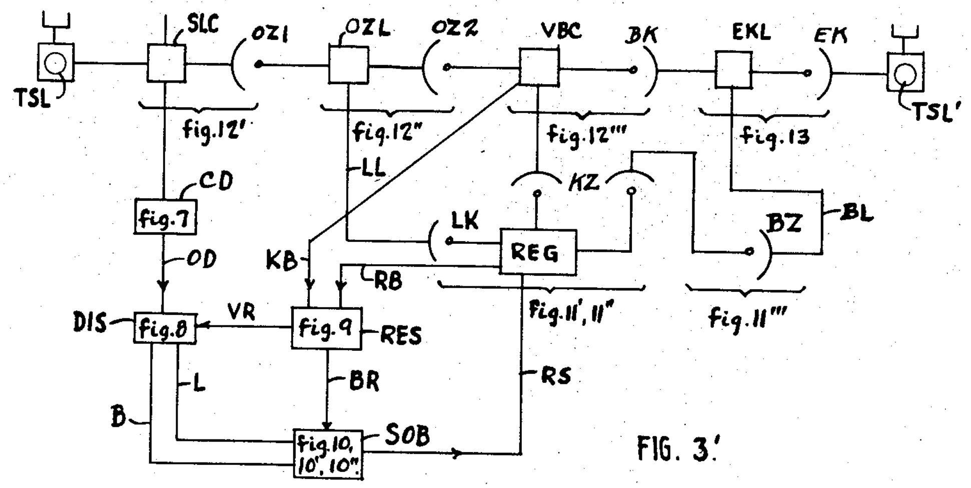
Figure 9:
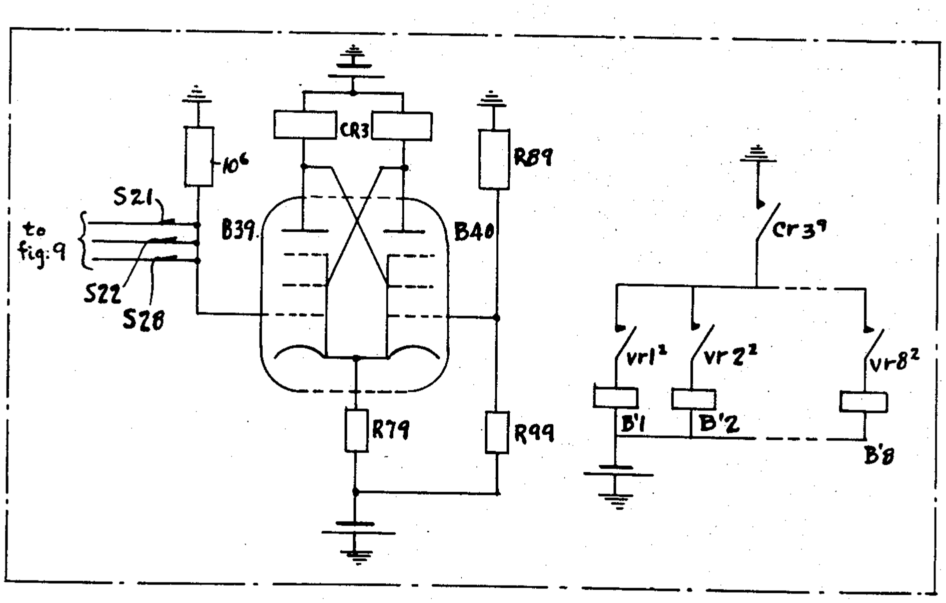
Figure 5:
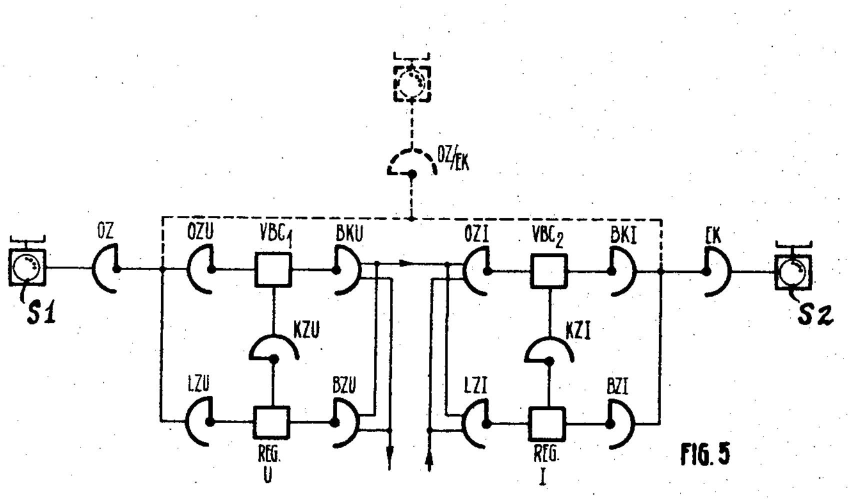
Figure 6:
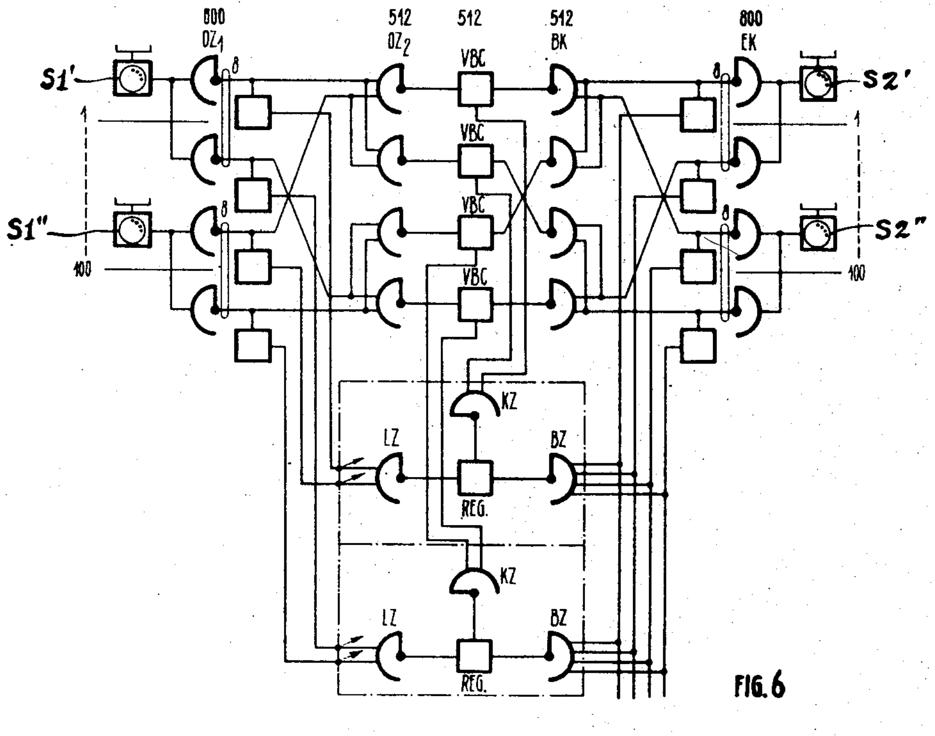
Figures 7, 8:
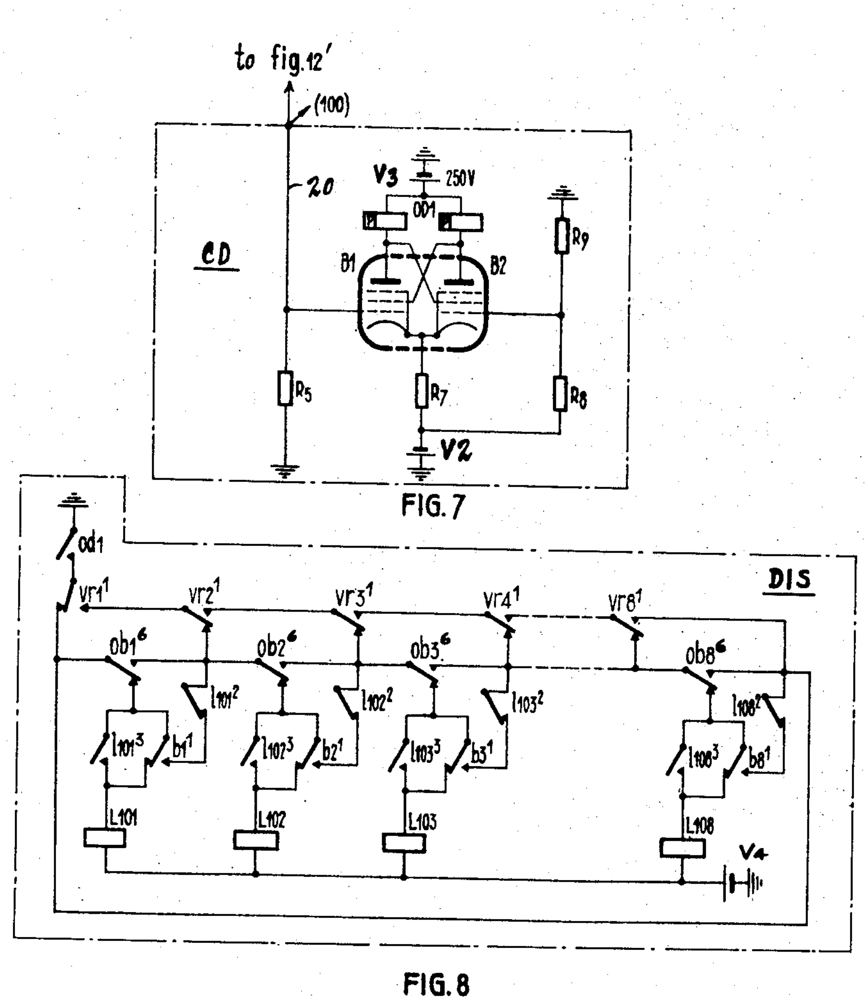
Figure 9:
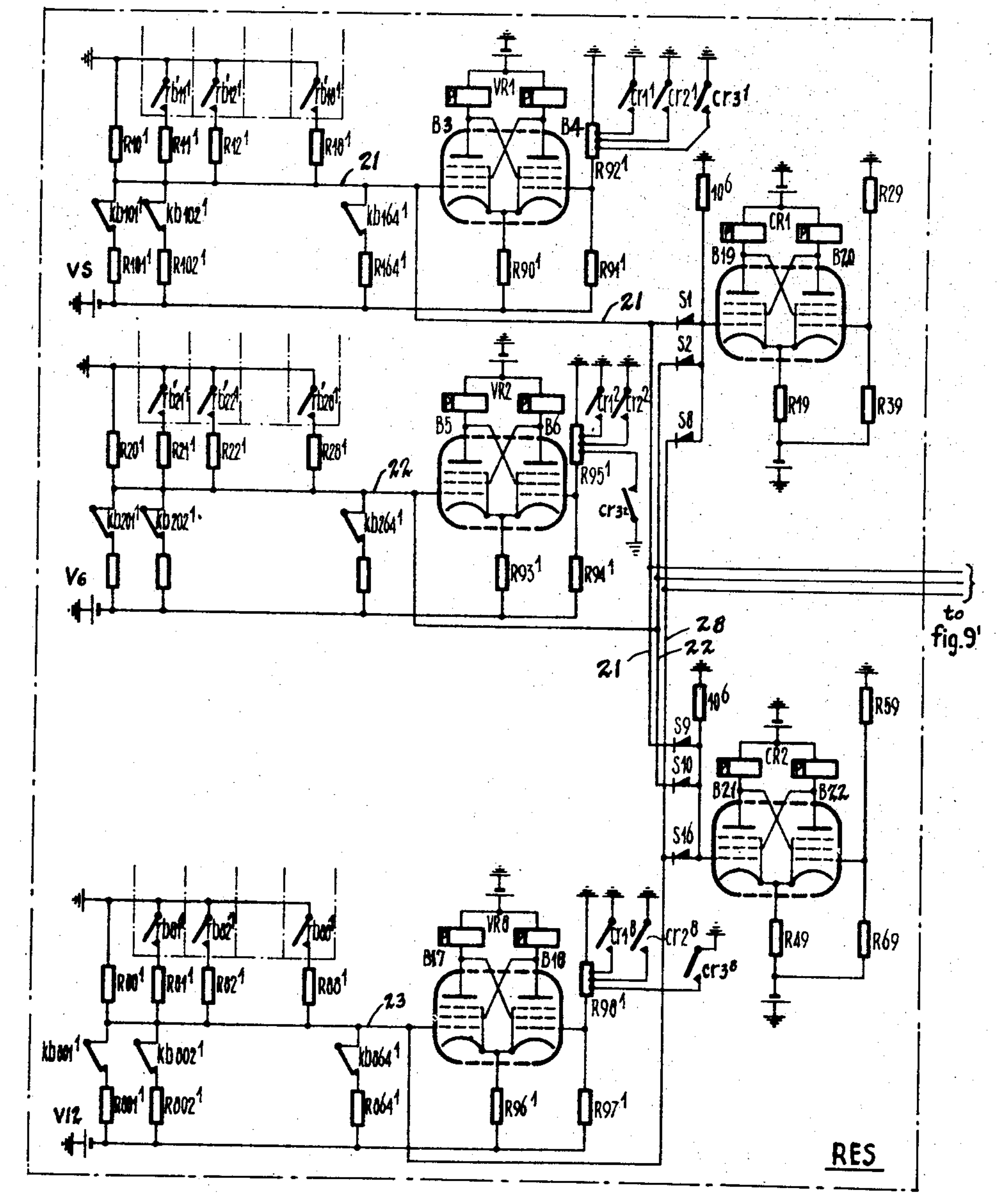
Figure 10:
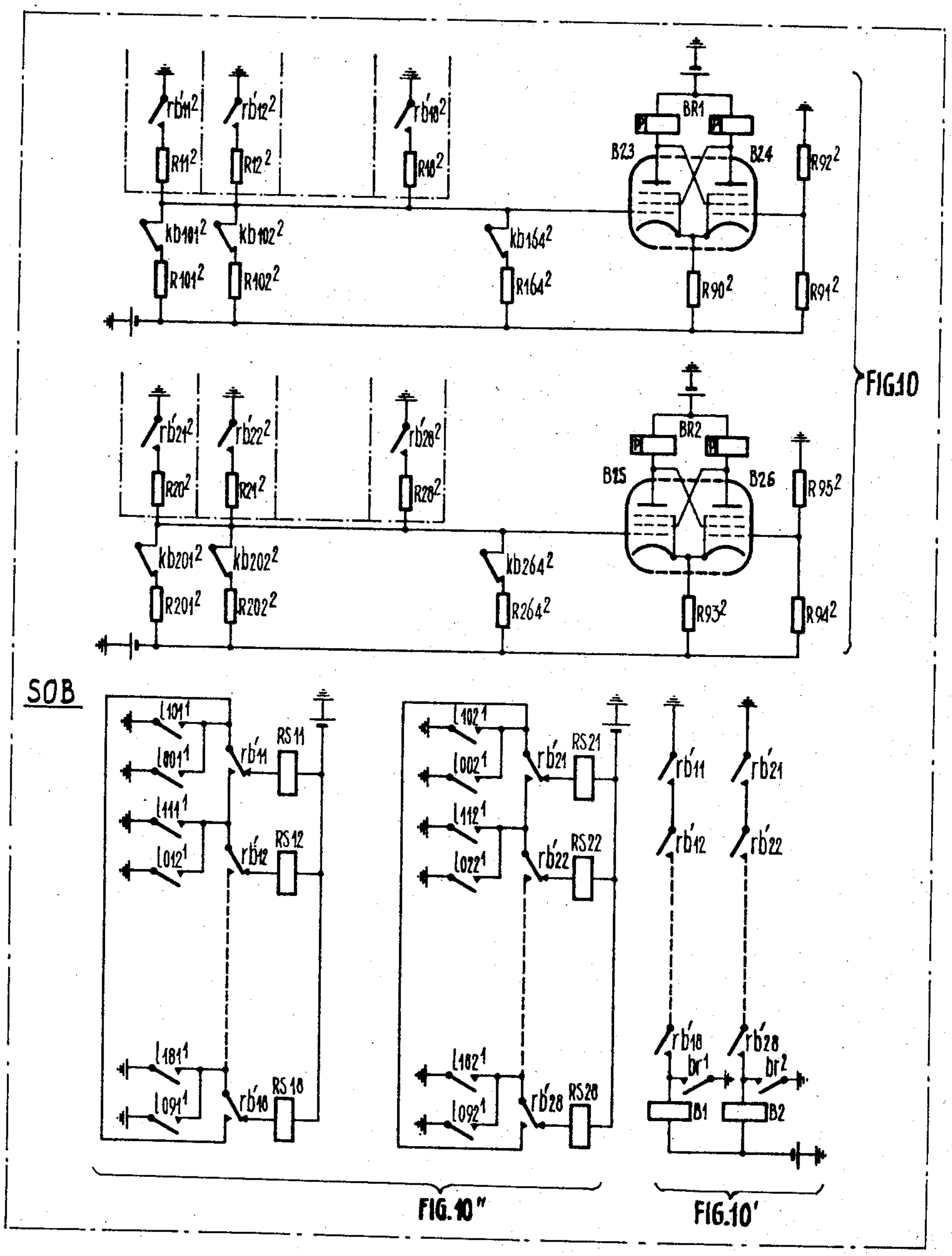
Figure 11:
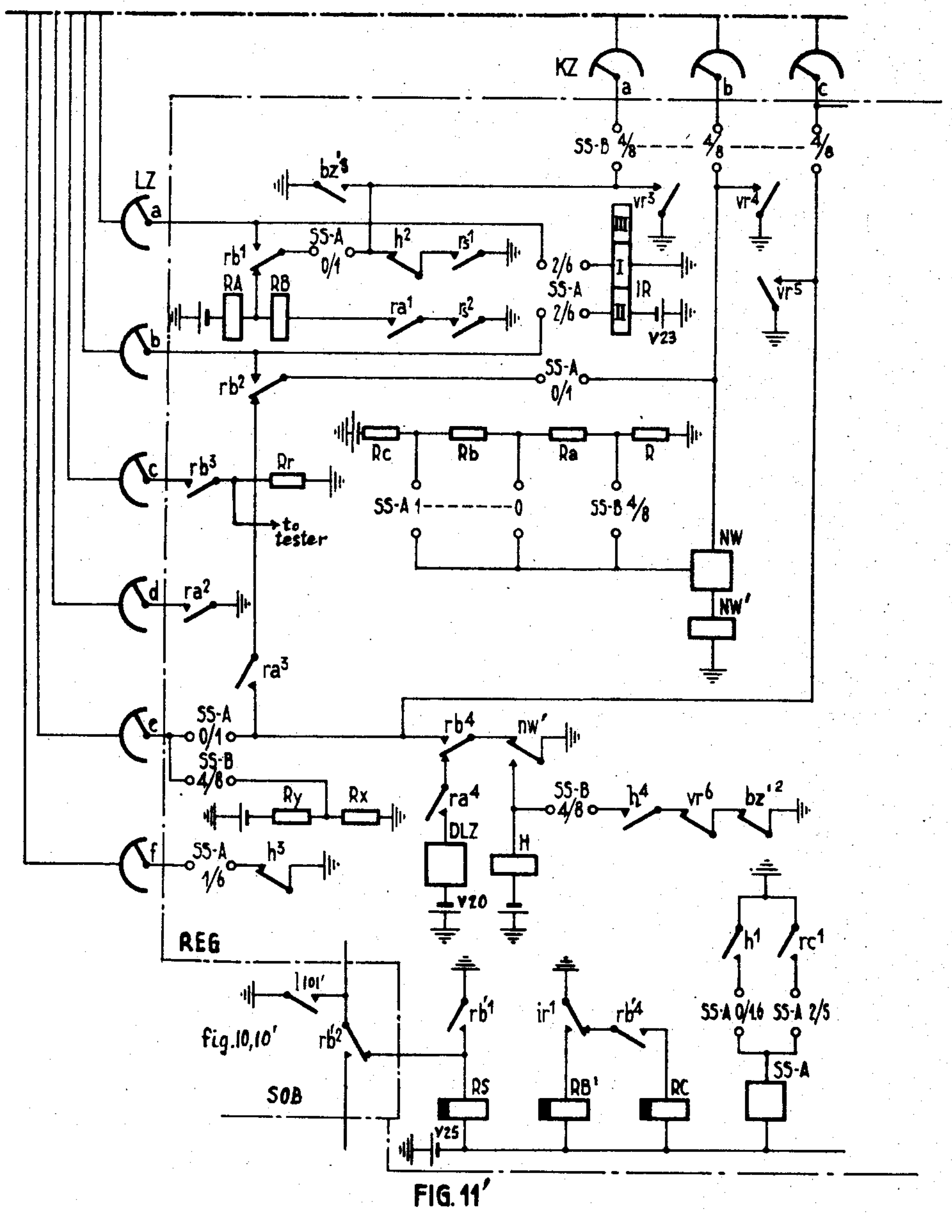
Figure 11:
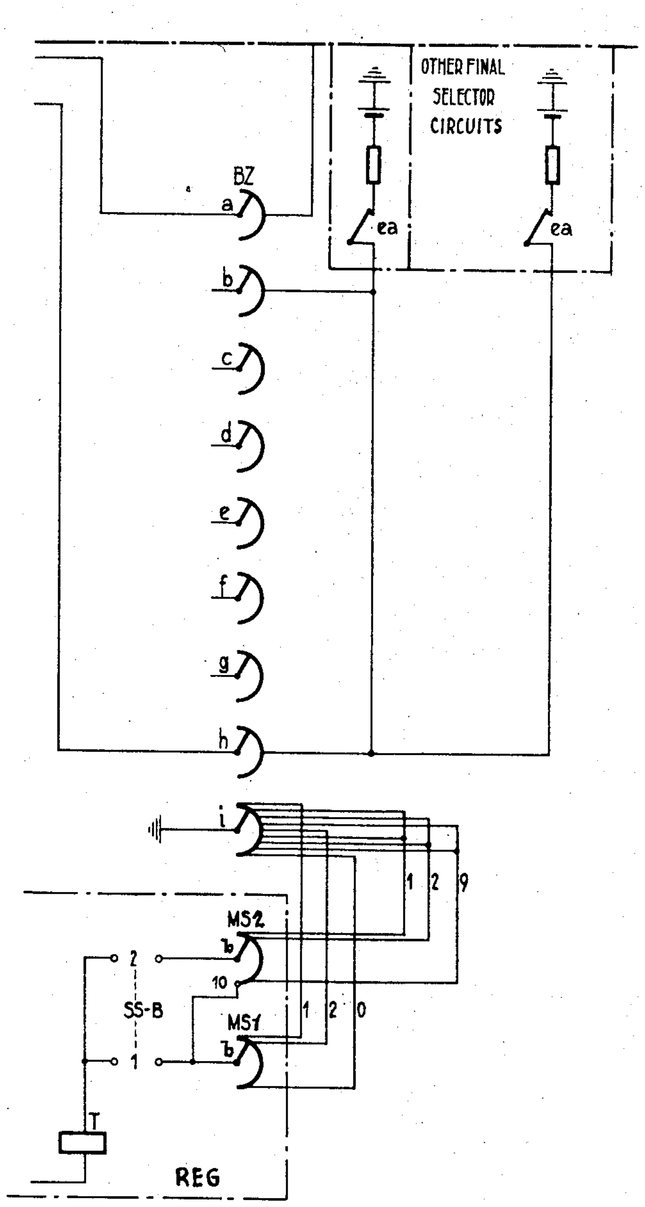
Figure 12:
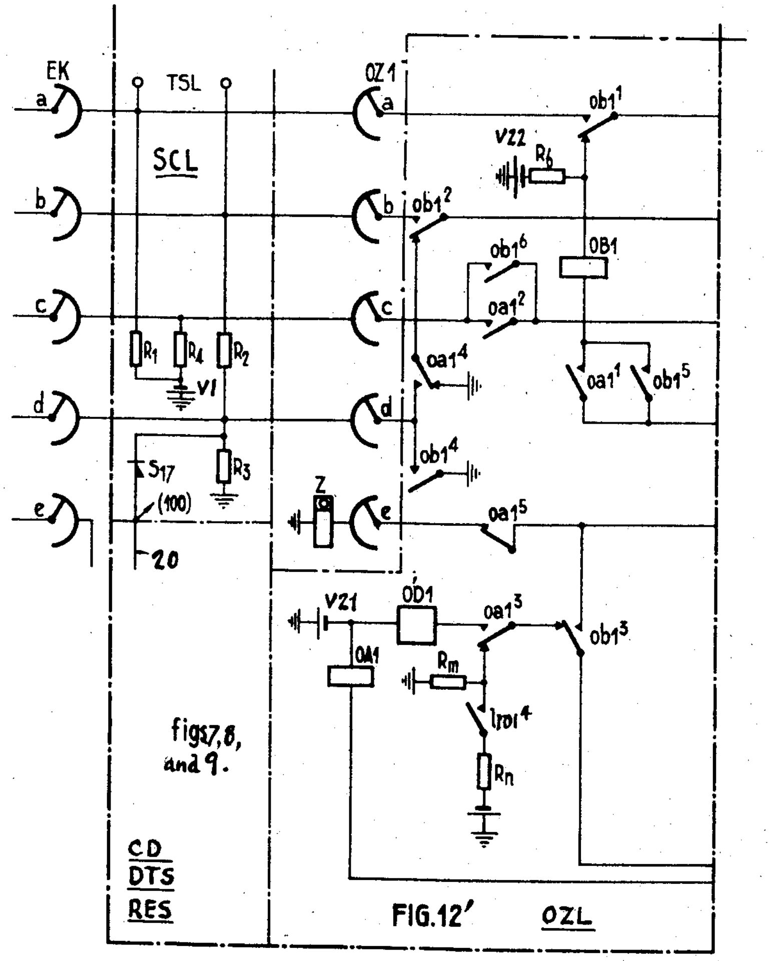
Figure 14:
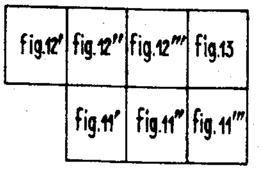
Figure 12:
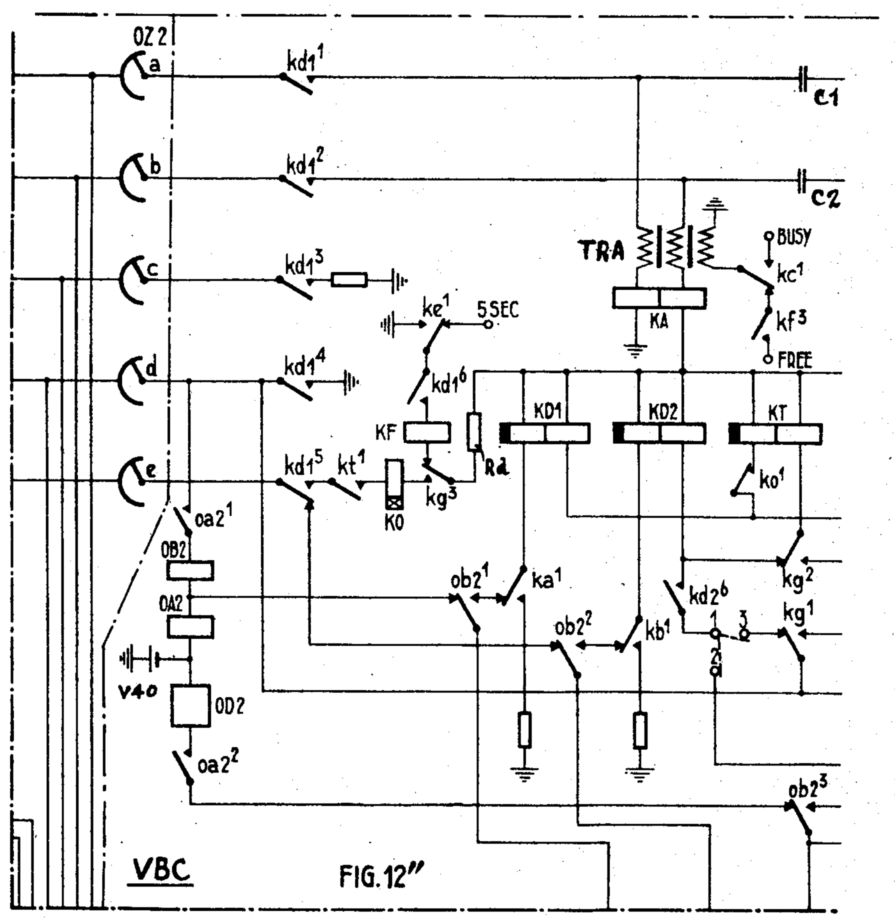
Figure 12:
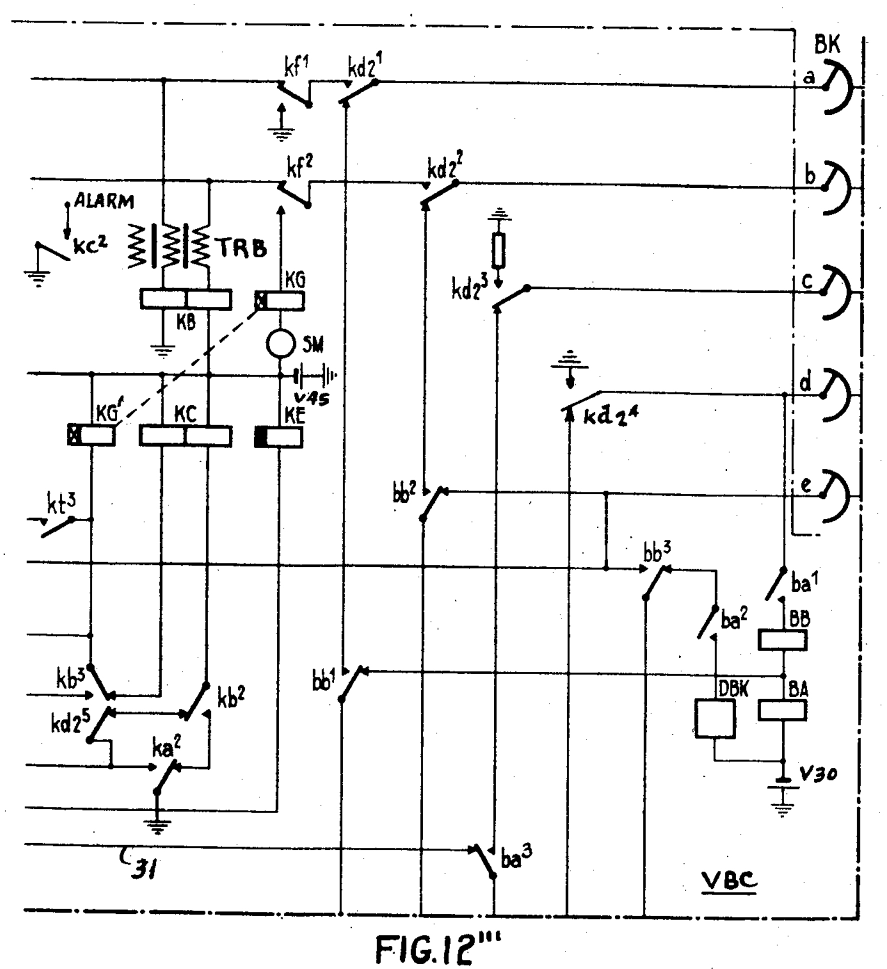
Figure 13:
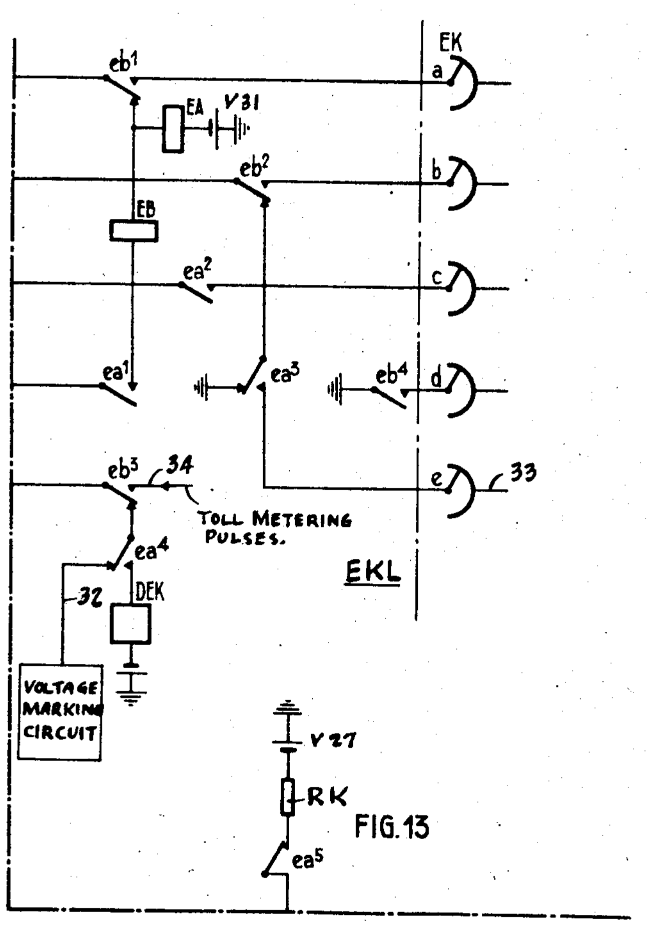

Fig. 3' is a block junction diagram showing schematically how the auxiliary controlling circuits of this invention are connected to the circuits shown in Fig. 3 and as disclosed in more detail in a combination of Figs. 7 through 13;

Fig. 4 is a schematic block junction diagram according to Fig. 3 showing how the first line finders and final selectors may be combined;

Fig. 5 is a schematic block junction diagram according to Fig. 3 adapted for a six digit exchange;

Fig. 6 is a schematic block junction diagram according to Fig. 3, showing how trunking may be applied to the system of this invention;

Fig. 7 is a schematic wiring diagram of the call detector part of an electronic line circuit for connection (to Fig. 12') between the final selector and first line finder contacts of a given multipled combination of subscribers;

Fig. 8 is a schematic wiring diagram of a distributing circuit according to the present invention for selecting a link to which may be connected a free register and a free cord circuit;

Fig. 9 is a schematic wiring diagram of a reserving circuit for determining the number of registers and cord circuits in each group that are busy and/or reserved for controlling the distributing circuit of Fig. 8;

Fig. 9' is a schematic wiring diagram of a blocking circuit which may be used in conjunction with Fig. 9 in place of the blocking circuit shown in Figs. 10 and 10';

Fig. 10 is a schematic wiring diagram of a part of a blocking circuit in which an indication of all of the busy and reserved registers and cord circuits is determined;

Fig. 10' is a schematic wiring diagram of the other part of the blocking circuit controlled by the part shown in Fig. 10;

Fig. 10'' is a schematic wiring diagram of the starting circuit for starting a preselected and free register in a group under the operation of the distributing circuit of Fig. 8;

Figs. 11' and 11'' show in combination a schematic wiring diagram of the link finder and cord finder of a register circuit which may be seized by the circuit of Fig. 10'';

Fig. 11''' is a schematic wiring diagram of a busy test selector circuit controlled by the circuits of the register shown in Figs. 11' and 11'', adapted to be connected to the right of Fig. 11'';

Fig. 12' shows a schematic wiring diagram of part of the line circuit between a final selector and first line finder for a given subscriber, and the first line finder controlling circuit, adapted to be connected to the left of Fig. 12'';

Fig. 12'' and 12''' show a schematic wiring diagram of a cord or connecting circuit between the first line finder of Fig. 12' and final selector of Fig. 13, including the associated second line finder and first selector and their control circuits, adapted to be connected to the top of Figs. 11' and 11'' of the register circuit;

Fig. 13 is a schematic wiring diagram of a final selector circuit adapted to be connected to the right of Fig. 12''' and to the top of Fig. 11'''; and Fig. 14 is a diagram of how Figs. 11' through 13 should be connected together to form a complete detailed wiring diagram of the block circuits shown in Fig. 3.

For reference purposes the following detailed description of the invention and accompanying figures in the drawings is divided into parts and sections according to the following outline:

I. General system connections:
   1. Development systems (Figs. 1 and 2)
   2. System of this invention (Fig. 3)
   3. System modifications (Figs. 4, 5 and 6)

II. Specific disclosure of a four digit rotary exchange:
   1. General operation (Fig. 3')
   2. Directing circuits (Figs. 7–10'')
      (a) Subscriber's line circuit and call detector (Figs. 12' and 7)
      (b) Distributor (Fig. 8)
      (c) Reserving circuits (Fig. 9)
      (d) Blocking circuits (Figs. 9' or 10 and 10')
      (e) Starting circuits (Fig. 10'')
   3. Register circuits (Figs. 11'–11''')
      (a) Link finder (Fig. 11')
      (b) First line finder (Fig. 12')
      (c) Dial impulse registering and busy test selector (Figs. 11', 11'' and 11''')
      (d) Cord finder (Figs. 11'', 11''', 12''' and 13)

4. Cord circuits (Figs. 12' and 13)
   (a) Positioning of selectors (Figs. 11'', 12''', 13)
   (b) Positioning of second line finder (Figs. 11' and 12'')
   (c) Busy testing of called subscriber (Figs. 11', 12'' and 12''')
   (d) Connection to called subscriber (Figs. 11', 12'', 12''' and 13)
   (e) Release of connection (Figs. 12'' and 12''')

I. GENERAL SYSTEM CONNECTIONS

1. *Development systems*

Figure 1:
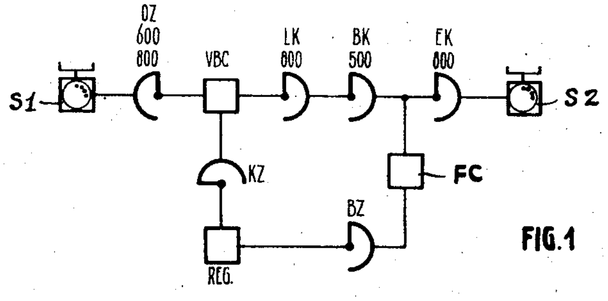
Fig. 1 is a schematic block junction diagram for an automatic switching system according to the Oberman prior copending application Serial No. 230,277 for comparison with the system of the present invention.

Referring to Fig. 1 there is shown a schematic system according to above mentioned Oberman co-pending prior application Serial No. 230,277 in which a calling subscriber S1 may be connected to a called subscriber S2 through a 10,000 line exchange, in which 600 or 800 one hundred point first line finders OZ are required for the subscribers. Between these line finders and 800 link selectors LK may be positioned 800 cord circuits VBC. To these cord circuits VBC may be connected the registers REG through cord finders KZ. To the 800 link selectors LK are connected the 500 intermediate or first selectors BK, which in turn may be connected to 800 final selectors EK which are connected to all and the called subscribers S2. According to this circuit the register REG is also connected through a busy call selector BZ and the final selector circuit FC to the final selectors EK, whereby the first digits of the called subscriber S2 transmitted to the register REG by the calling subscriber S1, may position the busy call selector BZ to preselect the proper group of final selectors EK to which the call must be connected and then set the link selectors LK and first selectors BK for the desired call. Thus, according to this circuit the first selecting stages are bridged and pre-set automatically by a controller circuit employed in the register REG.

Figure 2:
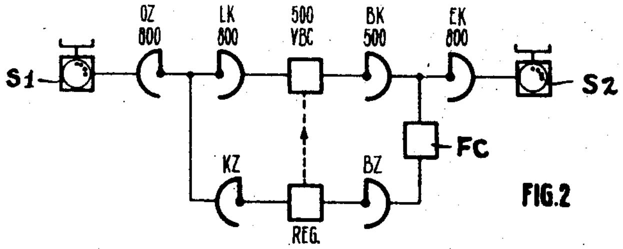
Fig. 2 is a schematic block junction diagram similar to that of Fig. 1 but showing a step in the development of the system of the present invention from that system shown in Fig. 1.

In order to develop this system of Fig. 1 further, it would be advantageous to reduce the number of cord circuits VBC to 500 and place them between the link selectors and the 500 first selectors as shown in Fig. 2. In such a system then the link selectors LK and first selectors BK are bridged by the register circuit REG, but the cord finder KZ is still connected between the first line finders OZ and the link selectors LK, so that the number of link selectors LK are not diminished from those employed in the circuit of Fig. 1.

2. *The system of this invention*

Referring now to Fig. 3, a further development of the system shown in Fig. 2 is provided wherein the 800 link selectors LK have been replaced by only 500 second line finders OZ2 corresponding to the 500 cord circuits VBC and the 500 first selectors BK, and only 60 link finders LZ have been connected from the corresponding 60 registers REG to the links between the first and second line finders OZ1 and OZ2. Since the number of second line finders OZ2 and the first selectors BK correspond in number to the cord circuits VBC, namely 500, they may be combined into one connecting circuit, if desired. The 60 link finders LZ connected to the REG in Fig. 3 are for finding the proper first line finder corresponding with the calling subscriber and thereafter to aid in positioning the second line finders OZ2 to said first line finder. However, the number of these link finders together with the number of second line finders, i. e. 60+300=360, is still much less than the 500 link selectors LK required in Fig. 2.

3. *System modifications*

In view of the symmetry of the system shown in Fig. 3 it can readily be seen that the number of final selectors and line finders are the same so that they may easily be combined as shown in Fig. 4, so that OZ/EK selector switches may be used either as first line finders or final selectors depending upon whether the subscriber S1 or S2 is a calling or a called subscriber.

The system according to Fig. 3 may be expanded for use with a system employing more than 10,000 lines or more than a four digit system, such for example as a six digit system. Such a system is shown in Fig. 5 for a 1,000,000 line exchange in which the exchange is divided into ten 10,000 line units and the junction between the different 10,000 line units is made through additional selecting stages, namely BKU and OZI for the outgoing and incoming calls, respectively. In this circuit, however, outgoing and incoming registers REGU and REGI, respectively, are also required. Furthermore, if desired, in view of the symmetry of this circuit, the first line finder OZ and final selectors EK may be joined together as shown by the dotted lines, corresponding to the system shown in Fig. 4.

An example of a trunking method for various groups of selectors and finders, according to the system of Fig. 3, is illustrated in the expanded schematic junction diagram of Fig. 6, in which each of the subscribers S1', S1'' may be connected to 200 point first line finders OZ1 and 200 point final selectors EK in which each 200 subscribers may be connected through any one of 16 selector switches "normally" or directly through the system and also may be cross connected or "by interconnecting" through the system, so that each subscriber may be reached by eight "normal" paths and at the same time there are eight "interconnecting" paths available which form the normal paths for the next hundred subscribers. For example, there may be 10 groups of 8 paths or links for each group of 1,000 subscribers of the system. However, in this system the number of second line finders OZ2, initial selectors BK and cord circuits VBC are slightly increased over those shown in Fig. 3, namely 512 instead of 500, but the selector switches OZ2 and BK need only the 100 point selector switches which are trunked through links to the first line finders and final selectors, respectively, in each group. In the link finders LZ and busy test selectors BZ 100 point finders also may be used while in the cord finders KZ, since there are 64 groups of 8, only 64 points need to be provided for each of the cord finder outlets. According to this circuit any connecting cord circuit VBC is in a position to reach any subscriber via the first selectors BK.

It is to be understood that the system of this invention is as applicable to push button subscriber sets as it is to dial sets, and that the other types of registers may be employed for controlling the circuits provided they perform the same functions as are required for the system of this invention. Furthermore, the number of final selectors and first line finders in the groups and the number of connecting circuits can be varied to conform with the traffic for a particular exchange. Also it should be noted that the system of this invention is readily adapted to the other types of selector-finder apparatus or switches offering the possibility of being moved to predetermined positions, such as for example, cross-bar switches including those in which the selection is done by receiving code bars like those employed in teleprinters. In fact, the system of this invention has been designed keeping in mind the advantages and the use of cross-bar switches for the selectors instead of the rotary switches shown and described in the specific example below.

II. SPECIFIC EXAMPLE OF A FOUR DIGIT ROTARY EXCHANGE

1. *General operation*

Before describing this example in detail, reference will be had to an amplified schematic block diagram according to Fig. 3, namely that disclosed in Fig. 3' in which the call detector, distributing, reserving, blocking and starting circuits and their connections are also shown.

In Fig. 3′ a calling subscriber TSL and a called subscriber TSL′ are connected from left to right from a subscriber line circuit SLC, through a first line finder OZ1 connected to a first line finder OZ1 and its circuit OZL, a second line finder OZ2 connected to a cord circuit VBC and then to a first selector BK, and then a final selector EK connected to its control circuit EKL, to a called subscriber TSL′. This is the path of the connection after it has been set-up through the system to be described in Figs. 7 through 13 inclusive below.

However, before this circuit may be set-up, the call is first detected by the call detector circuit CD which may be connected in multiple to 100 calling subscribers through the subscriber line circuit SLC, and which in the case a telephone system operates immediately when a calling subscriber TSL removed his receiver from the hook. The operation of the call detector circuit CD accordingly closes a contact in the distributor circuit DIS by the operation of a relay indicated by the connection OD. The contacts in the circuit DIS are previously set up according to the number of cord circuits VBC and registers REG which already have been reserved and/or occupied in the different groups of registers and cord circuits in the system controlled by connections KB and RB, respectively, to the reserving circuits RES. This reserving circuit RES accordingly counts the number of each of the cord circuits and registers in each group which are reserved, and according to this number operates through a connection VR certain contacts in the distributing circuit DIS. Thus, since there are contacts already operated in the distributing circuit DIS according to the known condition of operation and reservation of the cord circuits and registers, a definite path is immediately connected to a free one of a plurality of relays corresponding to the links to the first line finders, which control via the connection L the starting circuit SOB, which if all of the registers and cord circuits in the desired group have not already been occupied or reserved, seizes a corresponding free register REG, via connection RS. However, if all the registers have been seized or all the cord circuits are reserved or busy in the group, the reserving circuit RES operates through a connection BR to control the circuit SOB, which through the connection B to the distributing circuit DIS blocks that group in the chain of contacts in the distributing circuit DIS.

Now, as soon as a register REG has been found seized in a group which also has a free cord circuit VBC, the register REG operates its link finder LK associated therewith to find back the first line finder OZ1 through circuit OZL which is connected to the calling subscriber TSL. As soon as this connection has been set-up through the link connection LL to the register REG an "occupied" indication is given to the reserving circuit RES via a connection RB and a dialing tone is sent to the calling subscriber TSL indicating that he may now start dialing the to be called subscriber's number.

As soon as the calling subscriber TSL dials the first two digits of the number being called, these digits are stored in the register REG on suitable marking switches, which immediately position the associated busy test selector BZ to the multipled group of final selectors corresponding to the first digits of the number to which the initial selector BK must later be positioned. As soon as the busy test selector BZ is so positioned, the associated cord finder KZ is operated under the control of the register REG to find simultaneously a free final selector EK which corresponds with a free cord circuit in the group of registers and cord circuits which has already been selected by the distributing circuit DIS. In the meantime, however, the other dialing digits of the called subscriber may be stored on the marking switches in the register circuit REG.

When this combination of a free cord circuit VBC and final selector EK is found, the first selector BK associated with said found cord circuit VBC and its associated second line finder OZ2 may be positioned simultaneously under the control of the register REG. Once these two selector switches OZ2 and BK are positioned, there only remains the positioning of the final selector EK according to the last two digits of the dialed number stored in the register REG, to complete the circuit through the system as originally described above at the first of this section.

When this direct through connection has been completed, and the called subscriber TSL′ has answered his call, the corresponding "occupied" contact for the cord circuit VBC is operated in the reserving circuit RES via connection KB. The register REG together with its link finder LK, cord finder KZ, and busy test selector BZ may be freed and dropped from the circuit as soon as its functions have been completed.

2. *Directing circuits*

Reference will now be had to the detailed circuits shown in Figs. 7–13 arranged according to Fig. 3′ just described.

*a. Subscriber's line circuit and call detector*

Referring first to Figs. 7 and 12′, there is shown connected between the five line wires *a*, *b*, *c*, *d* and *e*, the line circuit for the subscriber TSL, which is connected to the *a*, *b*, *c*, *d* and *e* wires through means of various resistances and a rectifier to the call detector circuit CD shown in Fig. 7. As soon as the subscriber starts to make a call, i. e. when he raises the receiver from the hook of his telephone set, a circuit is completed from one pole of a battery, herein shown to be the ground and positive pole, through resistances R3 and R2, the hook contact in the telephone set (not shown) and back through resistance R1 to the other and herein the negative pole of a battery V1. In closing this circuit a potential is applied to the rectifier S17 which is more negative (say −10 volts) than that ordinarily applied thereto, which potential is thereby applied through conductor 20 to the control grid of one of two tubes B1 and B2, such as a double pentode, of the electronic call detecting device CD shown in Fig. 7. This control grid of the tube B1 is normally connected also to ground or a positive potential over a high resistance R5, of say $10^6$ ohms so that when no negative calling potential exists on the *d*-wire of the line circuit SCL the grid is sufficiently positive to maintain tube B1 conductive. The other tube B2 accordingly has its control grid normally maintained at a constant negative voltage, say −5 volts, by a potentiometer of resistances R8 and R9 connected between ground and a negative pole of a battery V2, but which constant voltage is more positive than the calling voltage on the *d*-wire. The cathodes of the two tubes B1 and B2 may be connected together to the negative pole of battery V2 over a resistance R7, while their screen grids and anodes are arranged in such a manner as to form a bi-stable flip-flop or trigger circuit, with the outputs of the anodes of each tube B1 and B2 connected to separate coils of a polarized relay OD1, which coils are then connected to the positive pole of a high voltage source V3 such as a 250 volt battery. Thus as soon as this calling subscriber closes his line circuit, the potential on the grid of tube B1 is reduced below that of the potential on the grid of tube B2 so that tube B2 becomes conductive and B1 becomes non-conductive, thus operating the relay **OD1 to close its contact *od*1 at the upper left hand** corner of Fig. 8 of tthe distributor circuit DIS.

The rectifier S17 in the call detector circuit shown, in conductor 20 in Fig. 12′ for each subscriber enables one call detector circuit as in Fig. 7 to be multipled for a group of a 100 subscribers. It is immaterial that more than one calling subscriber out of this group of 100 subscribers may energize this circuit at the same time in that additional registers and line finders will be automatically and successively operated to seek back and position separate line finders corresponding to each calling subscriber in the group as long as the corresponding call detector circuit CD remains operated.

*b. Distributor*

Referring now to Fig. 8, a distributor circuit DIS is shown in detail for one group of eight first line finder circuits multipled to the same 100 subscribers' lines. Thus, for each line finder circuit there is a chain of contacts $ob1^6$, $ob2^6$, $ob3^6$ . . . $ob8^6$ which are connected in series with the call detector contact $od1$ so that the first free line finder circuit in the group will be chosen or selected, that is one which does not have its contact $ob^6$ operated or has its $ob^6$ contact remaining in the position shown in Fig. 8. There is also shown another chain of contacts $vr1^1$, $vr2^1$, $vr3^1$ . . . $vr8^1$ which also select one of the first line finder circuits which is associated with a group of registers and cord circuits having less than a predetermined number of its cords and registers already reserved or occupied. The operation of these contacts $vr1^1$ . . . $vr8^1$ are controlled by the reserving circuits RES shown in Fig. 9 which are described in the next section. The closure of contact $od1$ accordingly will cause a circuit to be completed from ground through contact $od1$, one or more contacts $ob^6$ and $vr^1$, and a corresponding one of the contacts $b1^1$, $b2^1$, $b3^1$ . . . $b8^1$ to a corresponding one of the first line finder designating relays L101, L102, L103 . . . L108 to a battery V4. This circuit energizes one of said relays L101–L108 which operates its corresponding contacts: $l101^1$ to $l108^1$ to select a free register (see Fig. 10''); $l101^2$ . . . $l108^2$ to prevent the following relay L102 . . . L108 from operating wrongly by completing a circuit which may have been prepared by the intermediate operation of one of the contacts $b1^1$ . . . $b8^1$; $l101^3$ . . . $l108^3$ to hold its corresponding relay L101 . . . L108 operated; and $l101^4$ . . . $l108^4$ to select a corresponding free first line finder (see circuit OZL in Fig. 12'). Now the first line finder circuit OZ1 on the group of eight multipled to the same 100 subscribers, has been selected which is also associated with a group containing a free register and an available cord circuit.

*c. Reserving circuits*

The cord and register busy and reserving circuits are similar to those described in the Oberman co-pending application Serial No. 265,456, filed January 8, 1951, in which application part of the circuit shown in Fig. 9 is described.

Referring now to Fig. 9, there are shown three of a group of eight reserving circuits, corresponding to eight groups of registers, each of which eight registers are normally associated with sixty-four cord circuits. Each of the eight reserving circuits may be provided with a double pentode tube B3–B4, B5–B6 . . . B17–B18 coupled in trigger or flip-flop circuits similar to the circuit shown in Fig. 7 for operating separate polarized relays VR1, VR2 . . . VR8, respectively, which relays control their corresponding contacts $vr1^1$, $vr2^1$ . . . $vr8^1$ shown in Fig. 8, one in each distributor circuit for each multipled group of 100 subscribers.

As an illustration, the operation of only one of the receiving circuits, namely the one shown at the top in Fig. 9, will be described in detail. In this circuit the grid of the tube B3 is connected to a common conductor 21, to which conductor are connected in parallel nine resistances $R10^1$ through $R18^1$ to one (and herein the ground and positive) pole of a battery, of which resistances $R11^1$ through $R18^1$ are connected in series, respectively, to contacts $rb'11^1$ through $rb'18^1$. These $rb'^1$ contacts are operated by their corresponding relays RB' (see one in Fig. 11') in each one of the eight registers associated with the particular group corresponding to the trigger circuit of tubes B3—B4. On the other hand, since there are more cord circuits required than registers, there are sixty-four resistances R101¹—R164¹ also connected in parallel to the common conductor 21, but to the other pole of a battery V5, each in series with sixty-four normally closed contacts $kb101^1$—$kb164^1$. These contacts $kb^1$ are operated by their corresponding relays KB in each one of the cord circuits VBC (see one in Fig. 12'''). Thus, when one of the cord circuits VBC is seized and busied its corresponding contact $kb^1$ is opened removing one of the resistance R101¹—R164¹ from the common conductor 21 and where one of its associates registers is energized one of its corresponding contacts $rb'^1$ is closed connecting one of the resistances R10'—R18' to the common conductor 21, which corresponds to the reservation of a cord circuit so far as the potential on the common conductor 21 is concerned.

The fixed resistor R10' (similar to resistors R20', R30', R40' . . . R80') may be so chosen that it corresponds to the number of registers, viz. eight, associated with this group of sixty-four cord circuits, and so that when the same number (eight) cord circuits are busied or have their corresponding resistances R101¹—R164¹ connected to the common conductor 21, the voltage on the conductor 21 is half battery V5 voltage, or the value at which the trigger tubes B3—B4 change conductivity to operate relay VR1. That is, when there are no registers in the relevant group engaged and 64—8=56 cord circuits of the group are engaged, there still will be insured the reservation of at least one cord circuit for each register circuit remaining to be energized in said group. The values of these fixed resistance R10', R20', R30' . . . R80' may be changed, as desired, to affect another triggering potential on conductor 21.

Thus, when a register is seized a contact $rb'^1$ of a certain group is closed and the voltage on the common conductor 21 approaches by one step the ground potential, and an equal potential shaft of the common conductor 21 occurs when a cord circuit VBC is busied by opening a $kb^1$ contact.

The voltage on the grid of tube B4 remains relatively constant through the potentiometer of resistors $R91^1$ and $R92^1$, however, the value of resistor $R92^1$ may be decreased in steps under the control of the additional trigger tubes B19—B20, B21—B22 which may have their grids connected through rectifiers S1 and S8 (similar to rectifiers S2—S7 and S9—S16) to the common conductor 21 (similar to conductor 22 through 28). When consequently the number of actually seized connecting circuits and the number of seized registers (equal to the number of reserved connecting circuits) exceeds a specific value, for example herein chosen to be 50, the conductor 21 will have a potential which is more positive than the fixed voltage supplied to the control grid of the tube B4 and thus tube B3 will become conductive operating the relay VR1. Thus, the number of cord circuits and registers seized in the system, determines the number of relays VR1—VR8 which will be operated, and determines which of the eight groups will be selected when the contact $od1$ in Fig. 8 is closed by a calling subscriber.

Furthermore, after 50 cord circuits have been operated in each of the eight groups shown in Fig. 9, sufficient potential will be withdrawn through the rectifiers S1—S8 by the connected common conductors 21 through 28, to operate the flip-flop circuit of tubes B19 and B20 to operate its relay CR1. The operation of relay CR1 closes its contacts $cr1^1$ through $cr1^8$ in each of the corresponding eight reserving circuits, thus reducing the value of the resistances $R92^1$, $R95^1$ . . . $R98^1$ so as to flip-flop back each of the circuits of tubes B3—B4 through B17—B18, so that an additional, say six, busy calls may be recorded on each one of these reserving circuits. This thus enables the distribution of the traffic, particularly during busy times, evenly throughout all of the cord circuits and their associated registers grouped in the system.

Still furthermore, an additional flip-flop circuit comprising double pentode tube B21—B22 (similar to circuit of tube B19—B20) may be connected to a polarized relay CR2 which operates its contacts $cr2^1$—$cr2^8$ to further reduce the value of resistances R92¹, R95¹ . . . R98¹, so that the tubes B3—B4 through B17—B18 of the eight reserving circuits may be flip-flopped back again after say 56 cord circuits in each of the eight groups shown in Fig. 9 have been reserved or busy. This circuit and relay CR2 now may permit the occupation of say four more circuits in each group. This is a second step in the distribution of the connecting and controlling circuits of this invention. The tubes B21—B22 are operated through the second set of rectifiers S9 through S16 connected, respectively, to the same eight common conductors 21—28, but these tubes B21—B22 are biased to flip-flop by the potentiometer of resistances R59 and R69 at a more positive potential in the combined conductors 21—28, than the bias fixed for the flip-flop of tubes B19—B20 by the resistances R29 and R39.

*d. Blocking circuits*

If all of the registers or all of the cord finders in any one of the eight groups shown in Fig. 9 have been occupied or reserved, such a group should be by-passed entirely from the system until it has become more free, and such is done by the operation of a corresponding blocking relay B1—B8 shown in Fig. 10′. The operation of such a relay B1—B8, operates its corresponding contacts $b^{1\prime}$ through $b8'$ in each of the 100 distributor circuits as the one shown in Fig. 8 to by-pass that group or groups in which no connection circuits are available.

The operation of these relays B1—B8 shown in Fig. 10′, may be under the control of circuits similar to those in Fig. 9 and now shown in Fig. 10, but not having any of the fixed resistances R10¹, R20¹, R30¹ . . . R80¹, or any of the means as relays CR1 and CR2 for changing the biasing voltages on the tubes B4, B6 . . . B18. Two of eight such trigger circuits are shown in Fig. 10 having double pentodes B23—B24 and B25—B26. These circuits, however, merely respond to the fact that all sixty-four of the cord circuits in its corresponding group are busy or occupied, and when this condition exists, the corresponding polarized relay BR1—BR2 is operated to close its contact $br^1$ or $br^2$ in Fig. 10′ to energize the by-passing or blocking relay B1 or B2.

There is also connected in parallel with the contacts *br*1 and *br*2 in Fig. 10′, a series of contacts *rb′* corresponding to the eight registers in each of the groups so that when all of the registers are occupied regardless of whether or not all the cord circuits are occupied, the corresponding relay B1—B8 will also be operated because no register would then be available to control the connection in that group.

Instead of the circuits shown in Figs. 10 and 10′ there may be provided an additional trigger circuit as shown in Fig. 9′, similar to that of tubes B19—B20 and B21—B22 shown in Fig. 9 connected to the conductors 21, 22 . . . 28 through rectifiers S21—S28, also to indicate when all sixty-four of the connecting circuits of any one group are busy or reserved. This circuit in Fig. 9′ may be used to control the blocking relays B′1 through B′8, which may be connected in parallel with each other to a contact $cr3^9$ of relay CR3 operated by the trigger tubes B39—B40 shown in Fig. 9′ when say 60 of the circuits in each group are occupied. Relay CR3 is also provided with contacts $cr3^1$ through $cr3^8$ to still further reduce the value of resistances R92¹, R95¹ . . . R98¹ in Fig. 9 so that the triggers B3—B4, B5—B6 . . . B17—B18 will flop-flop and operate again after 64 cord circuits in each corresponding reserving circuit have been occupied or reserved. Connected in series with each of the relays B′1 through B′8 are one of the contacts $vr1^2$ through $vr8^2$ corresponding to the relays VR1 through VR8 shown in Fig. 9, so that only that or those particular groups which have all sixty-four of their cord circuits busy or reserved will be blocked from all of the circuits in the system and further calls in that or those groups will be automatically directed to another group.

*e. Starting circuits*

There is shown in Fig. 10″ a circuit comprising groups of relays RS11—RS18, RS21—RS28 . . . , one corresponding to each one of the eight reserving circuits, which relays are located in each one of the corresponding registers, one RS relay being shown in register REG in Fig. 11′. These relays RS are energized by the closing of one of the contacts of relays L of a distributing circuit DIS (Fig. 8), for one of the line finders. In parallel with each of these contacts $l$–101¹, etc. there may be another contact $l$–001¹, etc. in accordance with the "normal" and "interconnecting" or overflow arrangements of the subscribers multipled contacts in accordance with Fig. 6, to further extend the use of the groups of registers and cord circuits of the system. There is also provided a chain of by-passing contacts *rb′*11, *rb′*12, *rb′* . . . in the circuits of Fig. 10″ which automatically by-pass those registers of a given group which already have been occupied, so that they cannot be doubly seized and the proper starting relay RS in a free register will be immediately energized. A portion of one of the circuits in Fig. 10″ is shown again the lower-hand corner of Fig. 11′ to show how the starting relay RS of the register REG in Fig. 11′ is energized by a contact $l$–101¹ and through a contact *rb′*2 (similar to *rb′*11, *rb′*12 . . .) for the seizing of this register REG as soon as its corresponding $l$–101¹ contact is closed.

According to the above described circuits the number of contacts which must be operated by the relays VR, RB′ and KB are many more than can practically be located on a single relay, and special relays with multiple contacts and/or also slave relays may be provided in order to operate all of the contacts of these relays shown and suggested in Figs. 8 through 10″ to effect the required selection, reservation and distribution through the many groups of circuits involved in the system.

3. *Register circuits*

*a. Link finder*

The operation of the starting relay RS in the register REG of Fig. 10″ or 11′ now may be followed through in the detailed description of the circuit of combined Figs. 11′ through 13 as arranged in Fig. 14. This starting relay RS is shown in Fig. 11′ to be a slow releasing relay so that when it is finally deenergized the other circuits, relays, switches and contacts in the cord circuit VBC will thus have had sufficient time to operate before the register REG is released after which the sequence switches, relays, etc. in the register can be reset to their home or normal position.

The operation of starting relay RS in Fig. 11′ closes its two contacts: *rs*1 to energize the relay RA in the associated link finder circuit through a circuit from ground through contacts $rs^1$, $h^2$, sequence switch contact SSA–0/1, contact *rb*1, and relay RA to battery and ground; and *rs*2 to prepare the circuit for the operation of relay RB.

The operation of relay RA in the link finder control circuit of link finder LZ operates its contacts: *ra*1 to further prepare the circuit for the operation of relay RB in series with relay RA when its shunt to ground through contacts *rb*1, SSA–0/1, $h^2$ and $rs^1$ has been removed; *ra*2 to connect the *d*-wiper of the link finder selector switch LZ to ground and to the first line finder circuit OZL; *ra*3 to prepare the circuit through the *e*-wiper of link selector LZ between the electronic zero tester or detector NW and its corresponding relay NW′ connected therewith and the marking voltage circuit of the first line finder circuit OZL (see Fig. 12′) through contacts $ob1^3$ and $oa1^3$ to potentiometer of resistances R*m* and R*n* connected by the closure of contact *l*–$101^4$ of corresponding relay L101 in the distributor circuit of Fig. 8; and *ra*4 which starts the link finder control magnet DLZ through a circuit from a battery V20 through magnet DLZ, contacts *ra*4, *rb*4 and *nw′* to ground.

The link finder LZ now continues to move until the zero detector NW finds the same marking potential between resistances R*n* and R*m* in Fig. 12′ over a circuit through contacts $oa1^3$, $ob1^3$, *e*-wiper of link selector LZ, contacts SSA–0/1, *ra*3, *rb*2, and another SSA–0/1 to detector NW, as the potential between resistances R*c*—R*b* and R*a*—R corresponding to the group of first line finder OZ1 and its link selected and marked by relay L–101 and its contact *l*–$101^4$. As soon as the marked line finder OZ1 corresponding with the calling subscriber TSL is found, detector NW energizes its relay NW′ to operate its change over contact *nw′* to open the circuit to link control magnet DLZ stopping the link finder LZ in connection with said desired first line finder, and to energize relay H which controls the operations of the sequence switch SSA.

The energization of relay H operates its contacts: *h*1 to energize the sequence switch SSA but this switch does not operate until this circuit is broken so that *h*1 only prepares the sequence switch to moving to its position SSA–1; *h*2 to break the ground shunt around the relay RB so the relay RB in the link finder circuit LZ may now operate; *h*3 to open the circuit through the *f*-wiper of link finder LZ to prevent the operation of relay OA1 in the first line finder circuit OZL of Fig. 12′ at this time or until the zero detector relay NW′ is released; *h*4 to hold relay H energized during the positions 4 through 8 of another sequence switch SSB corresponding to the positioning of the selectors BK and EK described later.

The relay RB in the control circuit of the link finder LZ of Fig. 11′ is now energized in series with the relay RA, and operates its contacts *rb*1, *rb*2, *rb*3 and *rb*4 which connect, respectively, the *a*-, *b*-, *c*- and *e*-wipers of the link finder LZ to their corresponding wires of the first line finder OZ1 in Fig. 12′; and simultaneously therewith contact *rb*2 breaks the circuit to the detector NW and its relay NW′ which latter causes the release of relay H, and contact *rb*4 breaks the circuit to the link control magnet DLZ so that a later return of the contact *nw′* will not cause the link control magnet DLZ to be reenergized. The release of relay H, opens its contact *h*1 so that the sequence switch SSA steps to its first position SSA–1, and closes its contact *h*3 so that a circuit is now completed from ground through contacts *h*3, SSA–1, *f*-wiper of link finder LZ, relay OA1 to battery V21 and ground to energize relay OA1 in the first line finder circuit of Fig. 12′.

*b. First line finder*

The energization of the first line finder relay OA1 in the circuit of Fig. 12′ operates its five contacts: $oa1^1$ to prepare the circuit for the operation of relay OB1; $oa1^2$ to connect the *c*-wiper of the first line finder OZ1 to the *c*-wipers of both the link finder LZ and second line finder OZ2; $oa1^3$ to start the control magnet O′D1 to move the first line finder switch OZ1 to hunt for the particular calling subscriber's line; $oa1^4$ to connect the *d*-wiper of the first line finder OZ1 to the electronic zero detector NW in the register REG of Fig. 11′; and $oa1^5$ to open the circuit in the *e*-wiper to prevent at this time the operation of the meter relay Z (described later).

The detector NW is now connected to compare the marking voltage of calling subscriber's line circuit SCL between resistances R3 and R1–R2 over the *d*-wiper of the first line finder OZ1, contacts $oa1^4$, $ob1^2$, *b*-wiper of link finder LZ, contacts *rb*2, and SSA–1 to the detector NW, with the potential between the resistances R*c* and R*b*—R*a*—R. As soon as the desired voltage is tested and the calling subscriber's line is found, the relay NW′ and its contact *nw′* are operated again to energize the relay H for the second time and break the circuit to the first line finder control magnet O′D1 from battery V21, magnet O′D1, contacts $oa1^3$, $ob1^3$, *e*-wiper of link finder LZ, and contact SSA–1, *rb*4 and *nw′* to ground. This second energization of relay H, operates its contacts *h*1 to energize the sequence switch SSA for stepping to its second position SSA–2 when relay H is released; *h*2 to disconnect the ground shunt from relay OB1 via the *a*-wiper of the link finder LZ and contact $ob1^1$ (see Fig. 12′); and $h^3$ to disconnect the *f*-wiper of link finder LZ so that the relay OA1 will become deenergized to prevent further searching of the first line finder OZ1.

The operation of relay OB1 is through a circuit from ground through battery V22, resistance R6, relay OB1, and contact $oa1^1$, *d*-wiper of switch LZ and contact $ra^2$ to ground, in the first line finder circuit OZL (see Fig. 12′); and relay OB1 operates its six contacts as follows: $ob1^1$ and $ob1^2$ to connect the *a*- and *b*-wipers of the first line finder OZ1 with the *a*- and *b*-wipers of the second line finder OZ2 and the *a*- and *b*-wipers of the link finder LZ, respectively; $ob1^2$ also to deenergize the detector NW and its relay NW′ to deenergize again the relay H so that the sequence switch SSA steps to its position SSA–2; $ob1^3$ to connect the *e*-wiper of the first line finder OZ1 with the grounded *e*-wiper of the link finder LZ; $ob1^4$ to ground the *d*-wiper of the first line finder OZ1 neutralizing the marking voltage of the calling subscriber's circuit SCL so that no further calls in this 100 group will be connected to this particular calling subscriber TSL; $ob1^5$ to hold relay OB1 energized through the d-wiper of link finder LZ; $ob1^6$ to bridge contact $oa1^2$ and maintain the *c*-wiper of the first line finder OZ1 connected to the *c*-wiper of the second line finder OZ2 and the *c*-wiper of link finder LZ.

The stepping of the sequence switch SSA to its second position SSA–2 now connects the relay IR (see Fig. 11′) and two of its windings I and II, respectively, to the *a*- and *b*-wipers of the link finder LZ, which wipers are connected correspondingly to the *a*- and *b*-wipers and wires of the first line finder OZ1 and the calling subscriber's line circuits SCL. The energization of relay IR is through a circuit from ground through one coil I, contacts SSA–2 through 6, *a*-wiper of finder LZ, $ob1^1$, *a*-wiper of finder OZ1, subscriber's set TSL, *b*-wiper of finder OZ1, $ob1^2$, *b*-wiper of finder LZ, SSA–2/6, coil II of relay IR, to a battery V23 and ground.

Relay IR operates its contacts: *ir*1 to energize the register occupied indicating relay RB′; and *ir*2 to operate the marker switches MS1 through MS4 in Fig. 11″ in response to the dialing impulses from the calling subscriber. Simultaneously, a dial tone may be given by a third coil III of the relay IR to the calling subscriber TSL over the *a*- and *b*-wire connection, so that he knows that the register REG in Fig. 11 has been selected and seized for him, and that he may start dialing the number that he wishes to call, or that of the to be called subscriber.

The energization of relay RB′ operates its many contacts as follows: *rb′*1 to hold starting relay RS energized; *rb′*2 and all its related *rb′* contacts in the circuits of Figs. 9 and 10″ that this register REG has been seized and a cord circuit of its associated group has been reserved; *rb′*3 to prepare for the operation of the marker switches MS1—MS4 in response to the dialing impulses which repeatedly energize and deenergize relay IR accordingly; *rb′*4 to prepare a slow releasing relay RC to be operated at the end of each train of dial impulses to then operate the sequence switch SSA; *rb′*5 to prepare relay K of the general register grant (see Fig. 11″); and *rb′*6 to prepare the free or busy indicating relay VR or BZ′, respectively, for operation when the called subscriber's line has been found.

If desired, at this time, a test of resistor R4 in the calling subscriber's line circuit SCL (see Fig. 12') may be made with resistor Rr over the c-wire of the link finder LZ by the circuit "To Tester" connected at the contact rb3 in the circuit of the link finder LZ, before a dial tone is given to the calling subscriber. However, since this additional test is not necessary the details of its circuit have not been shown.

*c. Dial impulse registering and busy test selector*

Now the dial tone is given, the calling subscriber may start to dial the impulses corresponding to the number of the to be called subscriber.

Each dial impulse releases the relay IR which operates its contacts ir1 and ir2, but since contact ir1 only disconnects momentarily the delayed release register occupied indicating relay RB', it does not release this relay. Contacts ir2, however, transmits each dial impulse to the marker switches. Since marker switch MS1 is the first and only one connected to the circuit because the sequence switch SSA is in its position SSA–2, the first train of dialing pulses is recorded in switch MS1. However, at the end of this dialing train, the relay RC is operated so as to close its contact rc1 which energizes and releases the sequence switch SSA to move to its third position SSA–3, so that the next and second train of dialing pulses are then recorded in the marking switch MS2, and so on for each of the four trains of dialing impulses corresponding to the four digits of the called subscriber's number. At the end of the four dialing impulse trains, the sequence switch SSA has stepped to its sixth position SSA–6, and the thousand, hundred, ten and unit digits of the called subscriber's number, are recorded or registered respectively in the marker switches MS1, MS2, MS3 and MS4.

At the time the first two dialing impulses trains are received, i. e. the thousand and hundred digits of the called subscriber's number, the sequence switch SSA operates successively the sequence switch SSB in Fig. 11'', so that the positions SSB1 and SSB2 are set by the release of the sequence switch moving from its positions SSA–2 and SSA–3 respectively, corresponding to the first two dialed digits. Positions SSB–1 and SSB–2 (SSB–1.2) energize the control magnet DBZ in Fig. 11'' of the busy test selector BZ, so that it operates to start the busy testing selector BZ to search first for a position corresponding to the first digit dialed, and then for a further position corresponding to the second digit through the b-wipers of the marker switches MS1 and MS2, respectively, in Fig. 11'''. When the first dialed position for selector BZ is found a circuit is completed from ground through the i-wiper of selector BZ, the b-wiper of marking switch MS1, test relay T and battery V25 to ground. The energization of relay T breaks the circuit to the control magnet DBZ to stop the hunting of the busy test selector BZ. At this time contact t energizes a slow releasing relay BR from ground through contact t, and SSB–1, relay BR to battery V25. Relay BR now operates its contacts: br1 to hold it energized while sequence switch SSB is in its position SSB–2 and relay T is not energized; and br2 to break the circuit to sequence switch SSB, provided sequence switch SSA has moved to its position SSA–4, to cause the sequence switch SSB to step to its second position SSB–2 breaking the circuit of relay T.

If the second digit which has already been marked by the b-wiper of marking switch MS2 is not "0," then the control magnet DBZ is again energized and busy test selector BZ is moved further until the second digit position is found, when it again completes a circuit to energize relay T through the b-wiper of marker switch MS2 and deenergize the control magnet DBZ. The contact t of relay T now breaks the holding circuit through contact br1 to relay BR so that this relay after a short delay releases operating its contact br2 to break the circuit to the sequence switch SSB to cause it to step to its third position SSB–3 completing its function in setting the busy test selector BZ to preselect the desired group of final selectors EK of the called subscriber.

If the second digit of the called subscriber's number has been "0," then as soon as the sequence switch SSB had reached its second position SSB–2, a circuit would have been completed through the tenth contact of marker switch MS–2 which is connected to the already found position of the b-wiper of the marker switch MS–1, so that relay T would be immediately energized to prevent the starting of the control magnet DBZ a second time, and relay BR could then release permitting the second sequence switch SSB to step to its third position SSB–3 as described above.

*d. Cord finder*

After the busy test selector BZ has been positioned and sequence switch SSB has passed from its first two positions SSB–1 and SSB–2 and moved to its third position SSB–3, a circuit is completed to energize relay A in the control circuit for the cord finder KZ shown in Fig. 11''. Relay A is energized through a circuit from ground through contacts $h2^1$, SSB3, b1, relay A to a battery V26 and ground. The energization of this relay A operates its contacts: a1 to prepare the circuit for energizing relay B in series with relay A when its shunt to ground is removed; and a2 to energize the cord finder control magnet DKZ for stepping the cord finder switch KZ to find a free cord circuit VBC which may be connected both to a free final selector of said preselected group of final selectors EZ determined by busy test selector BZ and to said register REG which is already connected to the calling subscriber's first line finder OZ1.

There may be provided separate banks of contacts in the busy test selector BZ for each of the eight groups of 100 final selector multipled groups for each 100 lines, and for example herein, the called subscriber may be connected to the a-wiper of selector BZ which has associated in its multipled group of 100 subscriber lines a free final selector preselected by said busy test selector BZ as indicated by the closed contact ea5 in Fig. 13 connected through a resistance Rk to a battery V27. All eight of the wipers a through h of the busy test selector BZ are connected to separate groups of contacts of the i-wiper of the cord finder KZ (see Figs. 11'' and 11''').

The cord finder control magnet DKZ continues to move the wipers of the cord finder KZ until the potential is found from battery V27 and is connected via resistance Rk, contacts ea5, a-wiper of selector BZ, i-wiper of cordfinder KZ, k2, conductor 30, back over c-wiper of cord finder KZ, conductor 31 and contact ba3 in cord circuit VBC (see Fig. 12'''), and back again over f-wiper of cord finder KZ and contact SSB–3 to and by direct current electronic tester circuit TG in the register REG in Fig. 11''. This potential detection by circuit GT operates its relay GT' to operate contact gt' to break the circuit to the control magnet DKZ stopping the cord finder KZ on a connection which connects all the circuits shown in Figs. 11 through 13 together, and to energize the relay H2 from a battery V28. This corresponds to the simultaneous selection by the register REG of a free final selector in the preselected multipled group of final selector EK and a free and available cord circuit VBC which may be connected to said final selector of said preselected group.

The operation of the relay H2 operates its four contacts as follows: $h2^1$ to remove the ground shunt from relay B permitting it to become energized; $h2^2$ to close the circuit to prepare the sequence SSB to step to its fourth position when relay H2 is deenergized; $h2^3$ to energize relay K from ground through contacts rb'5 and $h2^3$, relay K to a battery V28; and $h2^4$ to prepare for the operation of free indicating relay VR which is described later.

The energization of relay B operates the following four contacts: b1, b2, b3 and b4 which respectively connect the *d*-, *e*-, *h*- and *g*-wipers of the cord finder KZ, now connected to the cord circuit VBC shown in Figs. 12 and 13, directly with contacts of the sequence switch SSB in the register REG in Fig. 11″, so that contacts: *b*1 energizes relay BA in the first selector circuit BK (see Fig. 12‴); *b*2 prepares for marking potential positioning of selector BK; *b*3 prepares circuit for control magnet DBK of first selector BK as well as breaking circuit to the cord finder control magnet DKZ; and *b*4 prepares circuit for the energization of relay BB when its ground shunt is removed via the *d*-wiper of cord finder KZ.

The energization of relay K operates its two contacts: *k*1 to hold relay K energized for the duration of the seizure of the register circuit REG of Fig. 11; and *k*2 to apply ground to the *i*-wiper of cord finder KZ and to break the series test circuit above described for simultaneously finding a free cord circuit VBC connected to a free final selector EK, and simultaneously releases the testing circuit GT deenergizing its corresponding relay GT′ which moves its contact *gt*′ into the position shown again in 11″ to deenergize the relay H2, which by the opening of its contact $h2^2$ causes the sequence switch SSB to step to its fourth position. This fourth position SSB–4 of the sequence switch SSB prepares the circuit for energization of the control magnet OD2 of the second line finder OZ2 and control magnet DBK of the first selector BK, for simultaneously positioning the second line finder OZ2 with the already selected first line finder OZ1 and the first selector BK in accordance with the digits recorded in the first and second marking switches MS1 and MS2.

4. *Cord circuits* a. *Positioning of selectors*

With the sequence switch SSB now in its fourth position SSB–4 and the relay B of the control circuit for the cord finder KZ having been operated, the relay BA in the initial selector circuit BK of Fig. 12‴ is now energized through the following circuit from ground in the register of Fig. 11″, contacts *vr*2, SSB–4, *b*1, *d*-wiper of cord finder KZ, *bb*1, relay BA to a battery V30. The energization of this relay BA operates its three contacts as follows: *ba*1 to further prepare for the operation of relay BB, *ba*2 to start the operation of the control magnet DBK for moving the first selector switch BK; and *ba*3 to connect the *f*-wiper of the cord finder circuit directly to the *c*-wiper of the initial or first selector BK in preparation for testing the busy condition of the desired called subscriber's line which will be described later.

Since the sequence switch SSB is still in its position SSB–4, the control magnet DBK is now energized from a battery V30 through contacts *ba*2, *bb*3, *h*-wiper of cord finder KZ, *b*3, SSB–4 through 7, *nw*′1 and $1^1$ to ground. First selector switch B2 now moves until it finds over the *e*-wiper of the first selector BK the marking voltage (in a circuit not shown in Fig. 13) connected to conductor 32 through contacts $ea^4$, $eb^3$, *e*-wiper of selector BK, *bb*2, *e*-wiper of cord finder KZ, *b*2, SSB–4/7, to the electronic comparison circuit NW1 which compares with that from *a*-wiper of marking switch MS1 corresponding to the digit voltage from sources V′1—V′10. Then when this voltage is found the circuit NW1 operates its relay NW′1 to operate its contact *nw*′1 to break the circuit to and release the control magnet DBK stopping the movement of selector BK in accordance with the first or thousands digit of the called subscriber's number. This contact *nw*′1 simultaneously energizes the relay H2 again to prepare the sequence switch SSB to step to its next position SSB–5, and operate its contact SS–B to energize relay L through battery V28 and a contact SSB–4.

The energization of relay L (see Fig. 11″) operates its contacts: $1^1$ to release relay H2 through contact *nw*′1 so that the sequence switch SSB will step to its position SSB–5; and $1^2$ to maintain the ground shunt around relay BB to prevent its operation until the first selector is also positioned according to the second or hundreds digit of the called subscriber's number. The stepping of sequence switch SSB to position SSB–5 breaks the voltage comparison circuit to the detector NW1 at the *a*-wiper of the marking switch MS2, therefore its relay NW′1 is released and the control magnet DBK of the first selector is again energized through the same circuit as before. Similarly, as before the selector BK is further moved until the second marking voltage of the *a*-wiper of switch MS2 is found and comparison circuit NW1 is again operated releasing magnet DBK through control *nw*′1 and stopping the first selector switch BK in a position now according to both the thousands and hundreds digits of the called subscriber's number. Contact *nw*′1 now again operates the relay H2 which prepares the sequence switch SSB to step to its next and SSB–6 contact, but this time the relay L is not operated since the sequence switch SSB is in its fifth position which does not close the circuit through sequence switch positions SSB–4 and SSB–6 (SSB–4.6). Accordingly, since contact $h2^1$ is no shunted this time by $1^2$, the operation of the relay H2 through its contact $h2^1$ now removes the ground shunt around the relay BB, so that relay BB now can operate.

The energization of relay BB operates its three contacts: *bb*1, *bb*2 and *bb*3 which respectively connect the *d*-, *e*- and *h*-wipers of the cord finder switch KZ to the *a*-, *b*- and *e*-wipers of the first selector BK. When this occurs the circuit to the comparison circuit NW1 is broken by the operation contact *bb*2, so that the relay NW′1 is deenergized and its contact *nw*′1 returns to the position shown in Fig. 11″, deenergizing relay H2 so that the sequence switch SSB can now step to its sixth position SSB–6.

The same sequence of operations is now carried out for the positioning of the final selector BK as those just described for the positioning of the initial selector BK, but in this case they are tested by the already set positions of *a*-wipers of the marker switches MS3 and MS4, respectively.

First, the relay EA in the final selector circuit EKL of Fig. 13 is energized by the operation of contact *bb*1 through a circuit from ground in register REG, contacts *vr*2, SSB–4.6/8, *b*1, *d*-wiper of cord finder KZ, *bb*1, $kd2^1$, *a*-wiper of selector BK, relay EA to battery V31. Relay EA operates its contacts: *ea*1 to prepare circuit for energization of relay EB when its shunt through the *d*-wiper of cord finder KZ is removed; *ea*2 to prepare the connection to the direct current tester GT to *c*-wire to determine if called subscriber is free or busy; *ea*3 to connect comparison circuit NW1 to *e*-wiper of final selector EK and to conductor 33 to a corresponding voltage marking circuit similar to that connected to conductor 32 for positioning the final selector according to the tens and units digits of the called subscriber's number; *ea*4 to energize the control magnet DEK for starting the final selector EK to hunt for its tens and then its units position; and *ea*5 to remove that final selector from selection by other registers. The next two positions SSB–6 and SSB–7 of the sequence switch SSB position the final selector BK through the operation of the comparison circuit NW1 just as described for the positioning of the first selector BK.

b. *Positioning of the second line finder*

The positioning of the second line finder OZ2 may and preferably is carried out simultaneously with the positioning of the first selector BK described in the just preceding section, and may be accomplished as follows:

When the sequence switch SSB is in its fourth position SSB–4, it connects the *a*-, *b*- and *c*-wipers of the cord finder KZ, respectively, to ground the zero potential detector NW, and ground. The ground through contacts $rs1$, $h^2$, $a$-wiper of cord finder KZ and $ob2^1$ energizes relay OA2 connected to a battery V40.

Energization of the relay OA2 operates its two contacts: $oa2^1$ to prepare a circuit for the operation of relay OB2; and $oa2^2$ to energize the control magnet OD2 of the second line finder OZ2. This magnet OD2 starts the second line finder switch OZ2 to hunt for the link and first line finder OZ1 already positioned to the calling subscriber's line circuit, which position is detected by the detector NW and the operation of its relay NW′ to remove the ground on the $c$-wiper of the cord finder KZ via its contact $nw'$ in circuit with contacts $rb4$, SSB–4/8, $c$-wiper of cord finder KZ, $ob2^3$, $oa2^2$; magnet OD2 and battery V40. The voltage compared by the detector NW is that of potentiometer resistances R$c$—R$b$—R$a$ and R through the sequence switch SSB positions SSB–4/8 with that of potentiometer resistances R$y$ and R$z$ of the link finder circuit also in Fig. 11′ but connected to the detector NW through contacts SSB–4/8, $b$-wiper of cord finder KZ, $ob2^2$, $kd1^5$, $e$-wiper of second line finder OZ2, $ob1^3$, and then back through the $e$-wiper of the link finder LZ, and SSB–4/8. Simultaneously with the operation of contact $nw'$ to stop the hunting of the second line finder switch OZ2, relay H is energized and held energized through positions SSB–4/8 by its contact $h4$, and removes ground from the $a$-wiper of the cord finder KZ by its contact $h2$, thereby permitting relay OB2 to be energized in series with relay OA2 and the $d$-wiper of the link finder LZ.

The operation of relay OB2 operates its three contacts as follows: $ob2^1$ to prepare the circuit for the operation of relay KD1; $ob2^2$ to prepare the circuit for the operation of relay KD2; and $ob2^3$ to prepare the circuit for the operation of relay KE, all three of which relays are in the connecting or cord circuit VBC of Figs. 12″ and 12‴ and prepare to the connection of the calling subscriber through to the called subscriber over the $a$-and and $b$-wires.

c. *Busy testing of called subscriber*

While the sequence switch SSB is in its seventh position SSB–7 which is employed for finally positioning the final selector EK, a circuit is also set-up for the energization of slow release relay P in Fig. 11″ of the register circuit. This relay P operates its contacts: $p1$ to detect if the called subscriber is already occupied or busy, by preparing a circuit for the operation of free indicating relay VR; and $p2$ to break the circuit to the comparison device NW1 to deenergize its relay NW′1 which through its contact $nw'1$ deenergizes relay H2 to permit sequence switch SSB to step to its eighth position SSB–8.

In the eighth or last position SSB–8 of sequence switch SSB, the direct current detector circuit GT is connected through the $c$-wipers of both selectors BK and EK to see if the called subscriber's $c$-wire has more than a given voltage thereon derived from a battery similar to V1 in the line circuit SCL in Fig. 12′. If the called subscriber's line is busy this voltage is reduced by the connection of resistances similar to R1 and R2 and R3 to ground and insufficient to operate circuit GT; while if this line is free sufficient voltage will be detected by circuit GT for it to operate its relay GT′ which operates contact $gt'$ to again energize relay H2. If relay H2 is thus energized, its contact $h2^4$ will complete a circuit from ground through contacts $rb'6$, SSB–8, $p1$, $h2^4$, relay VR to a battery V41 to energize this free indicating relay VR.

However, if the called subscriber is busy and not sufficient voltage is detected over the $c$-wiper of the selectors BK and EK to operate the detector GT, relays GT′ and H2 will not be operated by the time the delayed relay P will release and return its contacts $p1$ and $p2$ to their positions shown in Fig. 11″. Now when contact $p1$ returns to its shown position, busy indicating relay BZ′ is energized through a circuit from ground through contacts $rb'6$, SSB–8, $p1$, relay B2′ to a battery V41.

The operation of busy indicating relay BZ′ operates its three contacts as follows: $bz'1$ to hold relay BZ′ operated until register circuit REG is released; $bz'2$ to disconnect relay H in the circuit of Fig. 11′ to permit sequence switch SSA to step to its seventh position opening all of its contacts and deenergizing relay IR to deenergize the register supervising relay RB′ and after a short delay to disconnect the register REG from the circuit in that it has now completed its functions, and to also deenergize relay OA1 to connect the meter Z in Fig. 12′ to the $c$-wire of the connections to the cord circuit VBC; and $bz'3$ which energizes relay KD1 in the cord circuit VBC of Fig. 12″.

The operation of relay KD1 in the cord circuit VBC operates its six contacts as follows: $kd1^1$ and $kd1^2$ connect the $a$- and $b$-wires from the second line finder switch OZ2 to separate coils of supervisory relay KA; $kd1^3$ and $kd1^4$ connect the $c$- and $d$-wires from the second line finder switch OZ2 to grounds; $kd1^5$ prepares a circuit for the energization of relay KO; $kd1^6$ prepares a circuit for the operation of relay KF.

The coils of the supervising relay KA are energized from a battery V45, one coil of relay KA, one winding of transformer TRA, through the line loop of the calling subscriber TSL (viz. via $kd1^2$, $b$-wiper of finder OZ2, $ob1^2$, $b$-wiper of finder OZ1, subscriber's set TSL, $a$-wiper of OZ1, $ob1^1$, $a$-wiper of finder OZ2, and $kd1^1$), another winding of transformer TRA, through the other coil of relay KA to ground. The operation of the relay KA operates its two contacts: $ka1$ to hold relay KD1 operated and $ka2$ to energize the busy signal controlling relay KC from ground via contacts $ka2$, $kd2^5$, $kb2$, relay KC to a battery V45.

The operation of this relay KC operates its two contacts: $kc1$ to connect a "Busy" signal to another coil of the transformer TRA; and $kc2$ which may be used to give an "Alarm" signal in the exchange if after one minute of sending the busy signal the calling subscriber has not released his connection or hung-up the receiver in his telephone set.

Thus, when the called subscriber is busy, the calling subscriber receives a busy tone over the $a$- and $b$-wires from transformer TRA through his line loop (traced above), and accordingly should immediately hang up his receiver and release the cord circuit VBC, by deenergizing supervising relay KA in the cord circuit VBC which then deenergizes relays KD1 and KC.

d. *Connection to called subscriber*

In the event that the free indicating relay VR in Fig. 11″ is energized instead of the busy indicating relay BZ, that is, that a sufficient potential has been applied to the $c$-wipers of selector BK and EK to operate the detector GT before the relay P has released its contact $p1$, then relay VR operates its six contacts as follows: $vr1$ to hold the relay VR operated; $vr2$ to disconnect ground from the circuit of the $d$-wiper of cord finder KZ and the $a$-wire through the first selector BK so that the shunt around the relay EB is removed so that relay EB can operate in series with relay EA; $vr3$ to energize relay KD1 in the cord circuit VBC through the $a$-wiper of the cord finder KZ; $vr4$ to energize relay KD2 in the cord circuit VBC through the $b$-wiper of the cord finder KZ; $vr5$ to energize relay KE in the cord circuit VBC through the $c$-wiper of the cord finder KZ; and $vr6$ to deenergize the relay H in the register circuit of Fig. 11′ to step sequence switch SSA to its seventh and open position and deenergize relay IR to deenergize the register supervising relay RB′ and after a short delay to disconnect the register REG from the circuit in that its functions of setting-up the connection are completed, and also deenergize relay OA1 to connect through the meter Z in Fig. 12′ to the $e$-wire.

The energization of relay EB operates its contacts: $eb1$ and $eb2$ to connect the $a$- and $b$-wires from the first selector BK to the *a*- and *b*-wipers of the final selector EK, respectively, connected to the called subscriber; *eb*3 to connect the *e*-wire from the first selector to conductor 34 which may be connected to a toll metering circuit for transmitting toll pulses to meter relay Z in Fig. 12′ of calling subscriber through operation of relay KT in the cord circuit VBC; *eb*4 to connect ground to the *d*-wiper of the final selector to prevent the call detector connected to the called subscriber from operating; and *eb*5 to open the busy indicating contact of the called subscriber's selector switch to the busy test circuits of the registers so another register cannot select this final selector.

The operation of relay KD1 and its contacts have already been described in the preceding section.

The energization of relay KD2 is from ground in the register REG, through contacts *vr*4, SSB–4/8, *b*-wiper of cord finder KZ, $ob2^2$, *kb*1, relay KD to a battery V45, and this relay KD2 now operates its five contacts as follows: $kd2^1$ and $kd2^2$ to connect through the *a*- and *b*-wires to the corresponding wipers of the first selector BK; $kd2^3$ to disconnect the detector GT from the *c*-wire through the selector switches and thereby deenergize by operating contact *gt′* the relay H2 so that sequence switch SSB can be reset; $kd2^4$ to connect ground to the *d*-wire and hold the selector relays BA, BB, EA and EB energized; $kd2^5$ to prevent the operation of the busy signal control relay KC; and $kd2^6$ to maintain the relay KD2 energized throughout the duration of the connection.

The closure of the contact *vr*5 operates delayed releasing relay KE through the circuit from ground in the register REG (Fig. 11′) through the contacts *vr*5, SSB–4/8, *c*-wiper of cord finder KZ, $ob2^3$, relay KE to a battery V45. This delayed releasing relay KE operates its contact *ke*1 which energizes the relay KF from ground through contacts *ke*1, $kd1^6$, relay KF, $kg^3$, registor R*d* to a battery V45.

The relay KF operates its contacts: *kf*1 and *kf*2 to apply ringing current to the *a*- and *b*-wire of the called subscriber's loop from ground through contact *kf*1, $kd2^1$, *a*-wiper of selector BK, *eb*1, *a*-wiper of selector EK, called subscriber's set (not shown but like SCL shown in Fig. 12′), *b*-wiper of selector EK, *eb*2, *b*-wiper of selector BK, $kd2^2$, *kf*2, coil KG of relay, and ringer SM to a battery V45; and *kf*3 to operate a clearing signal "Free" to the calling subscriber, similar to communication of "Busy" signal described above. Relay KF, however, is released in about a half a second because relay KE is deenergized shortly after it is energized by the disconnection of the register REG and breaking of ground connection through the *c*-wiper of cord finder KZ instigated by operation of contact *vr*6 described above. However, the release of relay KF connects it to a circuit with a five second interruptor "5 SEC" which causes relay KF to thereafter become energized once every five seconds to apply a periodic rhythm to the ringing current applied to the called subscriber until he answers his telephone or responds to the ringing signal.

As soon as the called subscriber answers, one of the answering relay coils KG or KG′ is energized; coil KG if he answers during the time the ringing current is applied, i. e. when contacts *kf*1 and *kf*2 are operated; and coil KG′ when the ringing current is cut off, i. e. when contacts *kf*1 and *kf*2 are not operated. When either coil KG or KG′ is energized, the following contacts are operated: *kg*1 to energize and/or hold coil KG′ energized; *kg*2 to connect relay KT to the metering *e*-wire 34 of the called subscriber; and *kg*3 to disconnect the relay KF and to prepare a meter relay KO for energization. The disconnection of relay KF maintains its contacts *kf*1 and *kf*2 in the position shown in Fig. 12‴ so that the relay KB is inserted in the called subscriber's loop and energized as long as the called subscriber is on the line or keeps his receiver off its hook.

Energization of relay KB by the called subscriber operates its contacts: *kb*1 to hold relay KB2 energized; *kb*2 to maintain the busy signalling relay KC deenergized but also to prepare it for operation when the calling subscriber hangs-up before the called subscriber to give a busy signal to the called subscriber until he hangs-up also; and *kb*3 to further hold relay KG′ energized in parallel with its own holding contact *kg*1.

The operation of the metering relay KT by a metering pulse on the *e*-wire from called subscriber's end of the circuit and conductor 34, operates its contacts: *kt*1 to energize the meter checking relay KO in the cord circuit and meter Z in the first line finder circuit; and *kt*3 to hold the delayed released winding of relay KT operated until the metering pulse has been relayed on to meter Z.

The operation of relay KO in the metering *e*-wire of the cord circuit depends upon a good connection to the meter Z, and then through its contact *ko*1, disconnects the holding circuit to the delayed releasing winding of the metering relay KT. If the metering *e*-wire to the calling subscriber or to meter Z is not in order then relay KO will not be energized and metering relay KT will remain energized even after the call connection has been released, keeping relays KD1 and KG′ also energized to energize the busy signalling relay KC to operate its contact *kc*2 to give an alarm signal "Alarm" to the operator at the exchange which also may have a delayed response of say one minute. This circuit to maintain relays KT, KG′, and KD1 so energized is from ground in cord circuit VBC through contacts $kd1^4$, *kg*1 to relay KG′ and battery V45; and contacts *kt*3 and *ko*1 to relays KT and KD1 in parallel to a battery V45. The cord circuit VBC is thus held in use until the meter Z is put in order.

*d. Release of the connection*

In the cord circuit of Fig. 12″ there are shown service terminals or contacts 1, 2 and 3, of which either 1 and 3 or 1 and 2 are connected together for making the call circuit release when the called subscriber only hangs-up or when a called and calling subscriber both hang-up, respectively.

In the case where terminals 1 and 2 are connected together and the calling subscriber hangs-up or returns his receiver to its hook before the called subscriber, a busy signal is given to the called subscriber for him to hang-up too. This busy signal is connected when calling subscriber by hanging-up releases the supervising relay KA which then releases relay KD1 after a short delay to release line finder relays OB1, OA2 and OB2, via contact $kd1^4$ and to energize the busy signalling relay KC from ground in the cord circuit VBC via a contact *ka*2 and front contact *kb*2, relay KC to a battery V45. This relay KC then operates its contact *kc*1 to send the "Busy" alternating current tone to the called subscriber through condensers C1 and C2 in the *a*- and *b*-wires through the called subscriber's loop, and if he does not hang-up within about a minute an alarm signal may be given to the operator in the exchange via contact *kc*2. When the called subscribed replaces his receiver he breaks the connection and completes the release of the other relays of the cord circuit VBC, i. e. relay KB to release relays KD2, KC and KG′ and thereafter via contact $kd2^4$ to release the selector relays BA, BB, EA and EB. When the called subscriber replaces his receiver or hangs-up before the calling subscriber in this service connection of terminals 1 and 2, then relays KB and KG′ are released but relay KB2 holds or stays energized via its right hand winding, holding contact $kd2^6$, terminals 1 and 2, and front contact *ka*2, which is advantageous when a called subscriber wishes to change to another telephone set connected to the same line, he will not have to leave one set open if the calling subscriber hangs on to the line. Thus, the connection remains as long as the calling subscriber keeps his set connected to the line.

In the other case of connecting terminals 1 and 3 together, the hanging up of the calling subscriber before the called subscriber, releases relay KA and then relay KD1 is released and busy signalling relay KC is energized as before, to inform the called subscriber to hang-up. However, if in this terminal 1—3 connection the called subscriber hangs-up before the calling subscriber, then the calling subscriber also receives a busy signal to hang up and if he does not respond to it within about a minute, then an alarm signal is given to the operator in the exchange. The hanging-up of the called subscriber then releases relays KB and KD2 which thereafter release the selector relays BA, BB, EA and EB. However, a busy signal to the calling subscriber is produced by the energization of relay KC from ground in the cord circuit VBC through front contact *ka*2, back contact $kd2^5$ and *kb*2 and relay KC to a battery V45. When the calling subscriber hangs-up then the remainder of the relays in the cord circuit are released and the call connection is completely disconnected.

While there is described above the principles of this invention in connection with specific apparatus, it is to be clearly understood that this description is made only by way of example and not as a limitation to the scope of this invention.

What is claimed is:

1. In an automatic switching system between a plurality of subscribers' lines having two line finding stages and two selection stages of a plurality of selecting switches, and having a plurality of cord circuits between the last line finding stage and the first selecting stage, a plurality of registers which may be connected to said cord circuits, and a plurality of link circuits between said first line finding stage and said registers, the improvement comprising means for controlling the connection through said stages comprising: means for detecting a calling subscriber's line, means for simultaneously selecting and reserving a free link circuit, a free register and a free cord circuit which may be connected to said free register and to the first line finder of said calling subscriber's line, and means connecting said calling to said called subscriber's line through said selected cord circuit by and under the control of said selected register.

2. A system according to claim 1 wherein the selecting switches, the link circuits, the cord circuits, and the registers are divided into predetermined interconnected groups, and wherein said selecting and reserving means include means for distributing the selection of said circuits and registers to those groups having the fewest number of busy and reserved circuits.

3. An automatic switching system between a calling and a called subscribers' lines, comprising: first line finders connected to said subscribers' lines, a plurality of cord circuits each having a second line finder and a first selector, final selectors connected to said subscribers, a plurality of registers each of which may be connected to a first line finder, a cord circuit and a final selector, means for selecting simultaneously a free register and a free cord circuit which can be connected together and to the first line finder connectable to the calling subscribers' line, means for preselecting a free final selector connectable to the called subscriber's line which can be connected to said selected cord circuit, and means for connecting said calling subscriber's line to said called subscriber's line through said selected free cord circuit and final selector.

4. An automatic switching system between a plurality of subscribers' lines, comprising: a plurality of first line finders connected to said subscribers' lines, a plurality of cord circuits each having a second line finder and a first selector, a plurality of final selectors connected to said subscribers' lines, a plurality of registers each of which may be connected to a first line finder, a cord finder and a final selector, means for selecting simultaneously a free register and a free cord circuit which can be connected together and to the first line finder connectable to the calling subscriber's line, means for simultaneously connecting in said selected cord circuit said second line finder with the first line finder corresponding to said calling subscriber's line and said first selector with the final selector corresponding to the called subscriber's line.

5. A system according to claim 4 wherein said system is controlled according to numbers assigned to each subscriber's line, each number having at least four digits, and each of said line finders and selectors are positioned according to two of said digits.

6. An automatic switching system between a plurality of subscribers' lines comprising: a first and a second line finding stage each having line finder switches, a first and a final selecting stage each having selector switches, a cord circuit for connecting said second line finding stage with said first selecting stage, a register circuit for connection to a cord circuit, means responsive to the energization of a calling subscriber's line for selecting a free register, means in said register circuit for selecting simultaneously the called final selector and a free cord circuit which may be connected thereto, further means in said register circuit for simultaneously controlling the connection of a second line finder to the first line finder of said calling subscriber's line and said first selector to said selected final selector of said called subscriber's line, and still further means in said register circuit for controlling the connection of said final selector to said called subscriber's line.

7. An automatic switching system between a plurality of subscribers' lines, comprising: first line finders connected to said subscribers' lines, cord circuits each having a second line finder and a first selector, final selectors connected to said subscribers' lines, registers each having a link finder, a cord finder and a busy test selector, a distributor operated by the energization of a calling subscriber's line to select simultaneously a free register and a free cord circuit which can be connected together and to the first line finder connectable to said calling subscriber's line, means in said register for selecting a final selector connectable to a called subscriber's line which can be connected to said selected cord circuit, means for simultaneously positioning in said selected cord circuit its second line finder to the first line finder corresponding to said calling subscriber's line and its first selector to said preselected final selector, and means for connecting said final selector to said called subscriber's line.

8. An automatic switching system between a plurality of subscribers' lines comprising: a first and a second line finding stage each having a plurality of line finders, a first and a final selecting stage each having a plurality of selectors, a plurality of groups of cord circuits for connecting said second line finding stage with said first selecting stage, a plurality of registers connectable to each group of cord circuits, a distributing circuit operated by the energization of a calling subscriber's line to select simultaneously a free register which may be connected to the first line finder connectable to the calling subscriber's line and to a group of cord circuits having a free and available cord circuit therein, and means for connecting said calling subscriber's line to a desired and called subscriber through said selected free cord circuit by and under the control of said selected free register.

9. A system according to claim 8 wherein said distributing circuit includes means for reserving a cord circuit in a group of cord circuits when a register in its connectable group of registers has been busied.

10. A system according to claim 9 wherein said distributing circuit includes means for distributing the traffic depending upon the number of busy and reserved cord and register circuits in each group.

11. A system according to claim 10 including means for increasing said number after all of said groups contain said number of busy and reserved circuits.

12. A system according to claim 9 wherein said distributing circuit includes means for blocking traffic from completely busy and reserved groups of cord circuits and connectable registers.

13. An automatic switching system between a calling and a called subscriber's line comprising: a first and a second line finding stage having line finders, a first and a final selecting stage having selectors, a plurality of groups of cord circuits for connecting said second line finding stage with said first selecting stage, a plurality of register circuits connectable to each group of cord circuits, a plurality of links connectable to said registers, a distributing circuit operated by the energization of the calling subscriber's line to select simultaneously a free register connectable to a free link which may be connected to the first line finder connectable to said calling subscriber's line and a group of cord circuits having a free and available cord circuit therein for connection to said first line finder, means for selecting simultaneously a free final selector corresponding to the called subscriber's line and a free cord circuit in said selected group of cord circuits which may be connected together, means for simultaneously connecting a second line finder to the first line finder of said calling subscriber's line and said first selector to said selected final selector of said called subscriber's line, and means for connecting said final selector to said called subscriber's line.

14. An automatic switching system between a plurality of subscribers' lines, comprising: a plurality of groups of multipled first line finders connected to said subscribers' lines, a plurality of groups of cord circuits each having a second line finder and a first selector, a plurality of groups of multipled final selectors connected to said subscribers' lines, a plurality of register circuits connectable to each group of cord circuits, each register having a link finder, a cord finder and a busy test selector, means for connecting said link finders to said line finders, means for connecting said busy test selectors to said final selectors, means for connecting said cord finders to said cord circuits, a call detector circuit responsive to the energization of a calling subscriber's line, a reserving circuit for selecting simultaneously a free register and its associated group of cord circuits having a free cord circuit therein which can be connected together and to a free first line finder connectable to said calling subscriber's line, means for connecting said free register to said first free line finder corresponding to said calling subscriber's line, means for selecting a group of final selectors corresponding to a called subscriber's line, means for simultaneously selecting a free cord circuit from said preselected group of cord circuits, and a free final selector from said preselected group of final selectors, means for simultaneously connecting a second line finder to said first line finder connectable to said calling subscriber's line and said first selector to said selected final selector connectable to said called subscriber's line, and means controlled by said register for connecting said final selector to said called subscriber.

15. An automatic switching system between a plurality of subscribers' lines, comprising: a plurality of groups of first line finders connected to said subscribers' lines, a plurality of groups of final selectors connected to said subscribers' lines, a plurality of groups of cord circuits each having a second line finder and a first selector, a plurality of registers associated with each group of cord circuits, means for indicating the number of cord circuits and register circuits busy and reserved in each group, means for indicating the first line finders occupied in each group, means responsive to the energization of a calling subscriber's line and to said two indicating means for simultaneously selecting a free first line finder, a free register and a connectable group of cord circuits in which less than a predetermined number of cord circuits are already reserved and busy, and means for setting-up the call from said calling subscriber's line to a called subscriber's line through said selected circuits.

16. A system according to claim 15 including means for simultaneously selecting a free cord circuit from said preselected group of cord circuits and a free final selector corresponding to the called subscriber's line.

17. A system according to claim 15 wherein said groups of cord circuits are arranged so that any one of said cord circuits may be connected to any group of first line finders and to any group of final selectors.

18. An automatic switching system between a plurality of subscribers' lines, comprising: a plurality of first line finders connected to said subscribers' lines, a plurality of final selectors each connected to said subscribers' lines, a plurality of groups of cord circuits each having a second line finder and a first selector, a plurality of registers connectable to each group of cord circuits, means for indicating the number of cord circuits and registers busy in each group, means for indicating the first line finders occupied in each group, and distributing means responsive to energization of a calling subscriber's line and to said two indicating means for selecting a free first line finder, a free register and a group of cord circuits in which less than a predetermined number of cord circuits and registers are already occupied for setting-up the call from said calling subscriber's line to a called subscriber's line, and means for simultaneously selecting a free cord circuit from said preselected group and a free final selector connectable to a called subscriber's line, means for simultaneously positioning the second line finder and the first selector of said selected cord circuit, and means under the control of said register for positioning said selected final selector, whereby said calling subscriber's line is connected to said called subscriber's line through said free selected cord circuit.

19. An automatic switching system between a plurality of subscribers' lines, comprising: a plurality of groups of multipled first line finders connected to said subscribers' lines, a plurality of groups of multipled final selectors connected to said subscribers' lines, a plurality of groups of cord circuits each having a second line finder and a first selector, a plurality of register circuits connectable to each group of cord circuits, each register having a link finder, a cord finder and a busy test selector, links for connecting said link finders to said first line finders, means for connecting said busy test selectors to said final selectors, and means for connecting said cord finders to said cord circuits, means for indicating the number of cord circuits and register circuits busy in each group, means for indicating the first line finders occupied in each group, and means responsive to energization of a calling subscriber's line and to said two indicating means for selecting a free first line finder connectable to said calling subscriber, a free register and a group of cord circuits in which less than a predetermined number of cord circuits are already reserved and busy, means for connecting said free first line finder to said free register, means for selecting a multipled group of final selectors corresponding to a called subscriber's line, means for simultaneously selecting a free cord circuit from said selected group of cord circuits and a free final selector from said selected group of final selectors, means for simultaneously connecting a second line finder to said free first line finder and a first selector to said free final selector, and means for connecting said free final selector to said called subscriber's line.

20. A system according to claim 19 including means for increasing automatically said predetermined number when all of said groups of cord circuits have said predetermined number of cord circuits therein and registers connectable therewith reserved and busied.

References Cited in the file of this patent

UNITED STATES PATENTS

| | | |
|---|---|---|
| 1,845,604 | Johnson | Feb. 16, 1932 |
| 1,851,482 | Baker | Mar. 29, 1932 |
| 2,093,117 | Carpenter | Sept. 14, 1937 |